US011582603B2

(12) United States Patent
Ryoo et al.

(10) Patent No.: US 11,582,603 B2
(45) Date of Patent: *Feb. 14, 2023

(54) LOW POWER RRC OPERATING METHOD AND DEVICE

(71) Applicant: Samsung Electronics Co., Ltd., Suwon-si (KR)

(72) Inventors: Sunheui Ryoo, Yongin-si (KR); Jungsoo Jung, Seongnam-si (KR); Jungmin Moon, Suwon-si (KR); Seunghoon Park, Seoul (KR); Byounghoon Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 81 days.

This patent is subject to a terminal disclaimer.

(21) Appl. No.: 17/168,860

(22) Filed: Feb. 5, 2021

(65) Prior Publication Data
US 2021/0168603 A1 Jun. 3, 2021

Related U.S. Application Data

(63) Continuation of application No. 16/324,832, filed as application No. PCT/KR2017/008804 on Aug. 11, 2017, now Pat. No. 10,917,786.
(Continued)

(51) Int. Cl.
*H04W 76/30* (2018.01)
*H04W 52/02* (2009.01)
(Continued)

(52) U.S. Cl.
CPC ... *H04W 12/0433* (2021.01); *H04W 52/0229* (2013.01); *H04W 76/10* (2018.02);
(Continued)

(58) Field of Classification Search
CPC .......... H04W 12/04033; H04W 76/30; H04W 76/27; H04W 76/10; H04W 52/0229;
(Continued)

(56) References Cited

U.S. PATENT DOCUMENTS

2012/0039278 A1 2/2012 Park et al.
2012/0236707 A1 9/2012 Larsson et al.
(Continued)

FOREIGN PATENT DOCUMENTS

CN 103703860 A 4/2014
CN 103858513 A 6/2014
(Continued)

OTHER PUBLICATIONS

Ericsson et al., R2-161744, draft CR for RRC Connection Suspend and Resume, 3GPP TSG RAN WG2 #93, Feb. 14, 2016.
(Continued)

*Primary Examiner* — Luat Phung
(74) *Attorney, Agent, or Firm* — Jefferson IP Law, LLP

(57) ABSTRACT

Disclosed are a communication technique of merging, with IoT technology, a 5G communication system for supporting a data transmission rate higher than that of a 4G system, and a system therefor. The disclosure can be applied to intelligent services (for example, smart home, smart building, smart city, smart car or connected car, health care, digital education, retail, security and safety related services, and the like) on the basis of 5G communication technology and IoT related technology. According to one embodiment of the present invention, a communication method of a base station comprises the steps of: determining an RRC state transition condition of a terminal; and transmitting information on the RRC state transition condition to the terminal, wherein the RRC state transition condition can include at least one timer
(Continued)

for the transition between RRC states and/or information indicating an RRC state to be changed.

18 Claims, 28 Drawing Sheets

Related U.S. Application Data

(60) Provisional application No. 62/373,610, filed on Aug. 11, 2016.

(51) Int. Cl.
*H04W 12/0433* (2021.01)
*H04W 76/27* (2018.01)
*H04W 76/10* (2018.01)

(52) U.S. Cl.
CPC ........... *H04W 76/27* (2018.02); *H04W 76/30* (2018.02); *Y02D 30/70* (2020.08)

(58) Field of Classification Search
CPC ...... Y02D 70/00; Y02D 70/12; Y02D 70/126; Y02D 70/10
See application file for complete search history.

(56) References Cited

U.S. PATENT DOCUMENTS

| | | | |
|---|---|---|---|
| 2013/0028069 | A1 | 1/2013 | Pelletier et al. |
| 2013/0039287 | A1 | 2/2013 | Rayavarapu et al. |
| 2013/0039339 | A1 | 2/2013 | Rayavarapu et al. |
| 2013/0260740 | A1* | 10/2013 | Rayavarapu .......... H04W 76/27 455/422.1 |
| 2014/0211673 | A1 | 7/2014 | Lu et al. |
| 2015/0078349 | A1 | 3/2015 | He et al. |
| 2015/0181525 | A1 | 6/2015 | Gupta et al. |
| 2015/0201375 | A1 | 7/2015 | Vannithamby et al. |
| 2015/0237547 | A1 | 8/2015 | Martinez Tarradell et al. |
| 2015/0358865 | A1 | 12/2015 | Fu et al. |
| 2018/0054796 | A1 | 2/2018 | Edge |
| 2019/0335397 | A1* | 10/2019 | Ganesan ........... H04W 52/0235 |
| 2019/0350037 | A1 | 11/2019 | Lee et al. |
| 2020/0314667 | A1* | 10/2020 | Fujishiro ............... H04W 76/20 |

FOREIGN PATENT DOCUMENTS

| | | |
|---|---|---|
| CN | 103916917 A | 7/2014 |
| EP | 2 557 890 A1 | 2/2013 |
| EP | 2 645 803 A1 | 10/2013 |
| EP | 2 645 804 A1 | 10/2013 |
| WO | 2012-050323 A2 | 4/2012 |
| WO | 2014-182911 A1 | 11/2014 |
| WO | 2015-013038 A1 | 1/2015 |

OTHER PUBLICATIONS

Korean Office Action dated Apr. 28, 2021, issued in Korean Application No. 10-2017-0102620.
3GPP TR 38.913 V0.2.0 (Feb. 2016), 3GPP Technical Specification Group Radio Access Network; Study on Scenarios and Requirements for Next Generation Access Technologies (Release 14). Feb. 2016.
NGMN 5G White Paper http://www.ngmn.org/5g-white-paper/5g-white-paper.html.
3GPP TR 22.891 Study on New Services and Markets Technology Enablers (SMARTER) Feb. 2016.
R2-163399 Summary of email discussion [93bis#23][NR] Deployment scenarios NTT DOCOMO, May 23-27, 2016.
RP-160671, New SID Proposal: Study on NR New Radio Access Technology, NTT DOCOMO, Mar. 7-10, 2016.
R2-162508, Energy Efficiency Enhancement for 5G Samsung, Apr. 11-15, 2016.
R2-163830 Discussion on new state in 5G NR, May 23-27, 2016.
R2-163831 Discussion on Performance of Light Connection, May 23-27, 2016.
R2-164670, Report of 3GPP TSG RAN WG2 meeting #94, May 23-27, 2016.
Ericsson: "Security for RRC Connection Suspend and Resume", 3GPP Draft; S3-160588_NBCIOT Disc Paper_RRC Resume_FIN, 3rd Generation Partnership Project (3GPP), Mobile Competence Centre; 650, Route Des Lucioles; F-06921 Sophia-Antipolis Cedex ; France, vol. SA WG3, No. San Jose Del Cabo, Mexico; May 9, 2016-May 13, 2016, XP051091644, Retrieved from the Internet: URL: http://www.3gpp.org/ftp/tsg_sa/WG3_Security/TSGS3_83_Los_Cab os/Docs/.
European Patent Office Communication dated Feb. 6, 2020, issued in Eurpean Application No. 17 839 883.0-1215.
Ericsson: "Handling of inactive UEs", 3GPP Draft; R2-163998—Handling of Inactive UEs, 3rd Generation Partnership Project (3GPP), Mobile Competence Centre; 650, Route Des Lucioles; F-06921 Sophia-Antipolis Cedex; France, vol. RAN WG2, No. Nanjing; May 23, 2016-May 27, 2016 May 22, 2016, XP051105333, Retrieved from the Internet: URL:http://www.3gpp.org/ftp/, Meetings_3GPP_SYNC/RAN2/Docs/.
Ericsson: Infrequent small data transmissions for inactive UEs, 3GPP Draft; R2-164028—Infrequent Small Data Transmissions for Inactive UEs, 3rd Generation Partnership Project (3GPP), Mobile Generation Centre; 650, Route Des Lucioles; F-06921 Sophia-Antipoli S C, vol. RAN WG2, No. Nanjing, P.R. China; May 23, 2016-May 27, 2016 May 22, 2016 XP051105358, Retrieved from the Internet: URL:http://www.3gpp.orglftp/Meetings_3GPP_SYNC/RAN2/Docs/.
Nokia Networks: "Solution: Mobility Framework", 3GPP Draft; S2-161008_MOBILITYFRAMEWORK-V2, 3rd Generation Partnership Project (3GPP), Mobile Competence Centre; 650, Route Des Lucioles; F-06921 Sophia-Antipolis Cedex; France, vol. SA WG2, No. Sophia Antipolis, FR; Feb. 23, 2016-Feb. 26, 2016 Feb. 22, 2016 XP051077997, Retrieved from the Internet: URL:http://www.3gpp.orglftp/ Meetings_3GPP SYNC/SA2/00cs/.
Ericsson: "Solution for Infrequent Small Data",3GPP Draft; S2-164249_WAS4109_WAS4007_WAS3312_INFREQ _SMALL_DATA V1, 3rd Generation Partnership Project (3GPP), Mobile Competence Centre; 650, Route Des Lucioles; F-06921 Sophia Antipolis Cedex; Fra, vol. SA WG2, No. Vienna, Austria; Jul. 11, 2016-Jul. 15, 2016 Jul. 17, 2016 XP051121872 Retrieved from the Internet: http://www.3gpp.orglftp/tsg_sa/WG2_Arch/TSGS2_116_Vienna/Oocs/.
European Search Report dated May 2, 2019, issued in European Patent Application No. 17839883.0.
3GPP TSG-RAN WG2 Meeting #93, Ericsson R2-161751 "RRC Resume signaling flow and RRC actions".
Hua et al. "Analysis of LTE Wireless Network Dropping Rate Optimization" Jul. 25, 2015.
Da Silva et al. 2016 IEEE International Conference on Communications Workshops (ICC), "A novel state model for 5G Radio Access Networks" Jul. 7, 2016.
Chinese Office Action dated Sep. 15, 2022, issued in Chinese Application No. 201780049280.7.

* cited by examiner

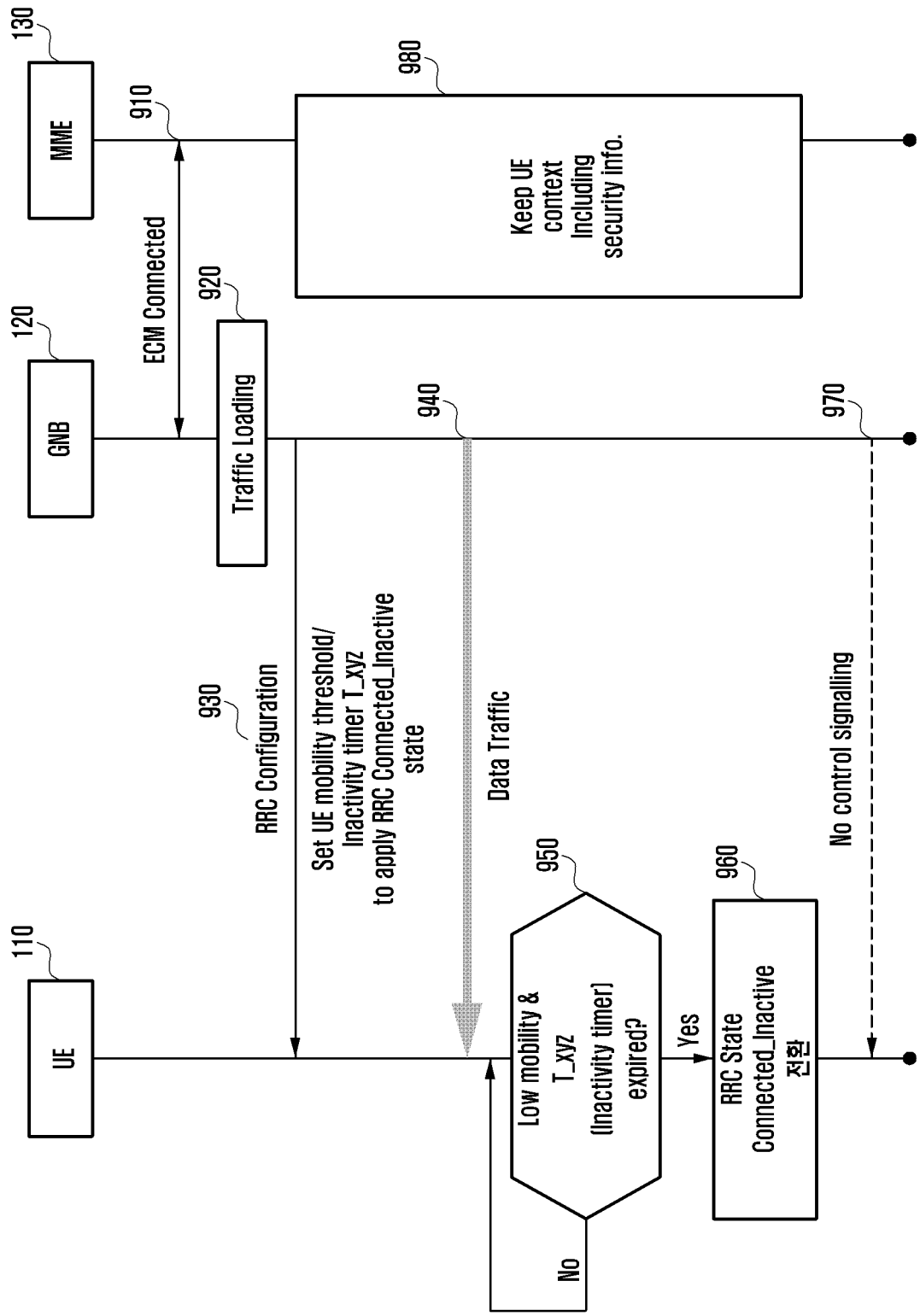

LOW POWER RRC OPERATING METHOD AND DEVICE

CROSS-REFERENCE TO RELATED APPLICATION(S)

This application is a continuation application of prior U.S. application Ser. No. 16/324,832 filed on Feb. 11, 2019, which is a U.S. National Stage application under 35 U.S.C. § 371 of an International application number PCT/KR2017/008804, filed on Aug. 11, 2017, and which claimed priority to a U.S. Provisional Application No. 62/373,610, filed on Aug. 11, 2016, and which will be issued as U.S. Pat. No. 10,917,786 on Feb. 9, 2021, the disclosure of each which is incorporated by reference herein in its entirety.

TECHNICAL FIELD

The present invention relates to a communication system and, more particularly, to a method and apparatus for low power radio resource control (RRC) operation in a communication system.

BACKGROUND ART

Since the commercial deployment of 4G communication systems, efforts have been made to develop improved 5G or pre-5G communication systems to meet the ever increasing demand for wireless data traffic. As such, 5G or pre-5G communication systems are also called "beyond 4G network" or "post LTE system."

To achieve higher data rates, 5G communication systems consider utilization of the mmWave band (e.g., 60 GHz band). To decrease path loss and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems.

To improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multi-points (CoMP), reception interference cancellation, and the like. In addition, advanced coding and modulation (ACM) schemes such as hybrid FSK and QAM modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G communication systems.

The 5G system aims to support a wider variety of services than the existing 4G system. For example, the representative services may include enhanced mobile broadband (eMBB), ultra-reliable and low-latency communication (URLLC), massive machine type communication (mMTC), and evolved multimedia broadcast/multicast service (eMBMS). The system providing the URLLC service may be referred to as a URLLC system, the system providing the eMBB service may be referred to as an eMBB system, or the like. The terms "service" and "system" may be used interchangeably.

Among them, the URLLC service is a newly considered service in the 5G system and, unlike the existing 4G system, requires satisfaction of extremely high reliability (e.g., packet error rate of about $10^{-5}$) and low latency (e.g., about 0.5 msec) compared with other services. To satisfy such strict requirements, it may be necessary to apply a shorter transmission time interval (TTI) to the URLLC service in comparison to the eMBB service. Various techniques utilizing short TTIs are being considered.

The radio resource control (RRC) states for data transmission and reception of a wireless communication terminal have been designed too conservatively due to the design philosophy of the previous generation based on the voice call. For example, even if there is no traffic for a certain period of time after receiving data, the terminal is on standby in the RRC connected state (e.g., connected DRX (discontinuous reception)), which may result in significant power consumption of the terminal. Additionally, in the case of a smartphone, a keep alive message, which is not related to the quality of service (QoS) of the user, frequently occurs as data. When the RRC connection for such data is designed based on the voice call service, the power consumption of the terminal may be further deteriorated.

DISCLOSURE OF INVENTION

Technical Problem

Accordingly, an aspect of the present invention is to provide a control signal and an operation method for RRC state transitions when the base station maintains an S1 connection, stores the UE context, and makes a transition to the RRC connected state in a light connectivity environment such as the RRC inactive state or the RRC idle state.

To solve the above problem, another aspect of the present invention is to provide a method for configuring and operating a low power operation of the terminal wherein, when the base station maintains an S1 connection, stores the UE context, and makes a transition to the RRC connected state in a light connectivity environment such as the RRC inactive state or the RRC idle state, the base station can operate without S1 connection setup and UE context creation.

Another aspect of the present invention is to provide a method that enables the terminal to reduce the connection waiting time, to improve power efficiency via long DRX operation in the connected mode, and to reduce power consumption by performing per-service QoS based aggregation control, measurement cycle extension/reduction, and efficient reduction of the radio tail period through modem mode control based on information regarding QoS requirement characteristics such as latency for each of supported services (e.g., eMBB, URLLC, and mMTC), applicability of light connectivity, and use of a smart terminal.

Another aspect of the present invention is to provide a method enabling the terminal to make an autonomous RRC state transition according to the configuration of the base station, and a definition of a new timer for switching to the RRC inactive state and a corresponding operation method, as a scheme for switching from the RRC connected state to the RRC inactive state or the RRC idle state. In addition, another aspect of the present invention is to provide an event design and configuration method for switching from the RRC connected state to the RRC inactive state or the RRC idle state.

Aspects, features or objects of the present invention are not limited to those described above. Other aspects and salient features of the present invention will become apparent to those skilled in the art from the following description.

Solution to Problem

In accordance with an aspect of the present invention, there is provided a method of communication for a base station. The method may include: determining a radio resource control (RRC) state transition condition of a terminal; and transmitting information on the RRC state transition condition to the terminal. The RRC state transition condition may include at least one of one or more timers for transition between RRC states or information indicating the target RRC state.

Determining an RRC state transition condition may include: receiving feedback information for determining the RRC state transition condition from the terminal; and determining the RRC state transition condition based on the feedback information.

The method may further include: receiving an RRC connection request message from the terminal; and performing an RRC connection procedure with the terminal according to cause information included in the RRC connection request message, wherein the cause information may include information on whether there is a need for the base station to retrieve the UE context and update security key information.

The method may further include receiving an RRC state transition request message from the terminal if the RRC state transition condition is satisfied.

In accordance with another aspect of the present invention, there is provided a method of communication for a terminal. The method may include: receiving information on a radio resource control (RRC) state transition condition from a base station; and performing an RRC state transition procedure if the RRC state transition condition is satisfied. The RRC state transition condition may include at least one of one or more timers for transition between RRC states or information indicating the target RRC state.

Receiving information on an RRC state transition condition may include: transmitting feedback information for determining the RRC state transition condition to the base station; and receiving the RRC state transition condition determined based on the feedback information.

The method may further include: transmitting an RRC connection request message to the base station; and performing an RRC connection procedure with the base station according to cause information included in the RRC connection request message, wherein the cause information may include information on whether there is a need for the base station to retrieve the UE context and update security key information.

Performing an RRC state transition procedure may include transmitting an RRC state transition request message to the base station if the RRC state transition condition is satisfied.

In accordance with another aspect of the present invention, a base station is provided. The base station may include: a transceiver configured to transmit and receive a signal; and at least one processor configured to determine a radio resource control (RRC) state transition condition of a terminal, and transmit information on the RRC state transition condition to the terminal. The RRC state transition condition may include at least one of one or more timers for transition between RRC states or information indicating the target RRC state.

In accordance with another aspect of the present invention, a terminal is provided. The terminal may include: a transceiver configured to transmit and receive a signal; and at least one processor configured to receive information on a radio resource control (RRC) state transition condition from a base station, and perform an RRC state transition procedure if the RRC state transition condition is satisfied. The RRC state transition condition may include at least one of one or more timers for transition between RRC states or information indicating the target RRC state.

Advantageous Effects of Invention

In a feature of the present invention, the communication system of the terminal and the base station may identify cases where low power is preferred and/or the service delay is permitted as part of RRC connection management for low power operation of the terminal, and may delay the transition from the idle state (or inactive state) to the connected state, so that power consumption of the terminal can be reduced.

In another feature of the present invention, by use of a method for switching from the RRC connected state to the idle (or inactive) state such as early C-DRX (connected mode discontinuous reception) transition, early RRC release, or early UE autonomous release, the standby time of the terminal in the RRC connected state (e.g., C-DRX and radio tail) is kept to a minimum. Hence, power consumption of the terminal can be reduced.

In another feature of the present invention, the early UE autonomous release operation may transmit data without issuing an RRC release message for RRC state transition, removing the corresponding control signaling burden and associated delay.

In another feature of the present invention, the reduction of RRC release messages for RRC state transition can increase the cost efficiency by reducing the power consumption of the 5G base station (RU or TRP), and can increase the radio resource usage efficiency by reducing the ambient interference between 5G cells.

Features or advantages of the present invention are not limited to those described above. Other features or advantages of the present invention will become apparent to those skilled in the art from the following description.

BRIEF DESCRIPTION OF DRAWINGS

FIG. 9A illustrates a procedure for determining the RRC state to be applied and controlling the radio tail in the communication system according to an embodiment of the present invention.

MODE FOR THE INVENTION

Figure 1:
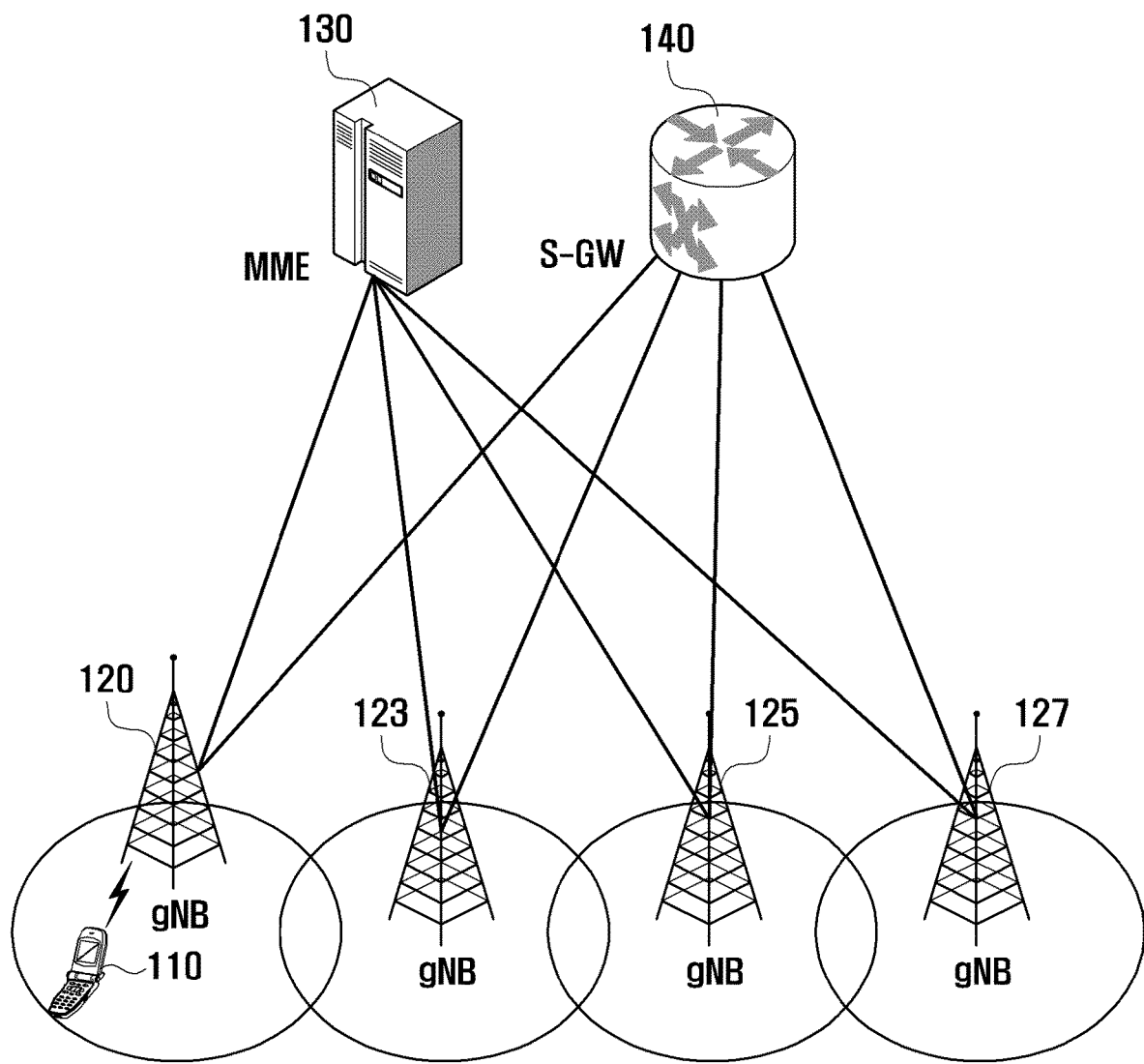
FIG. 1 illustrates the architecture of a communication system according to an embodiment of the present invention.

In the description of embodiments, descriptions of functions and structures well known in the art and not directly related to the present invention may be omitted for clarity and conciseness without obscuring the subject matter of the present invention.

It will be understood that when an element is referred to as being "coupled with/to" or "connected with/to" another element, it can be (electrically) coupled or connected with/to the other element directly or via a third element. In the description, an expression "have" or "include" indicates the existence of the stated features and does not exclude the existence of other features.

The components listed in the embodiments are shown to independently represent different characteristic functions, and do not mean that each component is composed of a separate hardware or software unit. That is, each component is included as a separate unit for ease of description, and two or more components may be combined into a larger component or one component may be divided into a plurality of smaller components while maintaining the same functionality. Those embodiments with combined components or with separated components may be included within the scope of the present invention without departing from the subject matter of the present invention.

Some of the components may be not essential components performing essential functions in the present invention but may be optional components for improving performance only. The present invention can be implemented only with components that are essential for realizing the subject matter except for the optional components used only for performance improvement, and the structure including only the essential components excluding the optional components is also included in the scope of the present invention.

Descriptions of well-known functions and structures incorporated herein may be omitted to avoid obscuring the subject matter of the present invention. Hereinafter, embodiments of the present disclosure will be described with reference to the accompanying drawings. Particular terms may be defined to describe the invention in the best manner. Hence, the meaning of specific terms or words used herein should be construed in accordance with the spirit of the present invention.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

In the description, the word "unit," "module," or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose large components and units. Components and units may be configured to drive a device or one or more processors in a secure multimedia card.

In the present invention, a description is given of operations of the base station and the terminal for achieving the energy efficiency KPI (key performance indicator) being discussed in 3GPP RAN 5G SI. The corresponding communication standard defines energy-efficient operation with a primary goal of improving power efficiency (bits/J) in the network of the terminal and base station by more than 1000 times within the next 10 years. To this end, it is necessary to reduce the active operation time of the terminal to cope with the possibility of additional power consumption due to beamforming transmission, which is indispensable to the mmW operation in extremely high frequencies.

In the present invention, a description is given of a method for controlling and maintaining the RRC (radio resource control) connection state based on the three RRC states (connected state, inactive state, and idle state), which are expected to be applied in a mobile communication system (e.g., 5G or new radio (NR)). In particular, a description is given of determining the RRC state (inactive state and/or active state) for data transmission, and improving the spectral efficiency and channel accessing when the terminal efficiently transmits traffic in the RRC inactive state.

In one embodiment of the present invention, the RRC connection management method for low power operation of the terminal may include delaying the RRC connection if low power is preferred and/or the service delay is permitted as part of switching from the idle state (or inactive state) to the connected state.

In one embodiment of the present invention, the method for switching from the RRC connected state to the idle (or inactive) state may include a scheme for early C-DRX (connected mode discontinuous reception) transitioning, a scheme for early RRC releasing, and a scheme for early UE autonomous releasing.

In one embodiment of the present invention, the communication system enables the 5G cell to keep the RRC connected (active) state to a minimum through minimization of the radio tail.

In one embodiment of the present invention, the communication method can perform an operation of RRC state switching without issuing an RRC release message for RRC state transition.

In one embodiment of the present invention, the method for the terminal to minimize the activated state of the radio link can efficiently control the radio tail length (e.g., user-inactivity timer) for the RRC connection of the terminal.

To achieve this, the communication method according to an embodiment of the present invention may consider the mobility environment (e.g., cell coverage, terminal (UE) mobility, and traffic load) and/or the existence of a control burden tradeoff when determining whether to apply the new RRC state (i.e., RRC inactive state). Here, the control burden tradeoff may include control signaling (e.g., paging and tracking area (TA) update) of the core network (CN). As an example, it may be advantageous to apply the RRC inactive state for a terminal moving at a speed lower than a given threshold.

In one embodiment of the present invention, the method for configuring the RRC state based user-inactivity timer (e.g., radio tail) can apply the short radio tail during the RRC inactive state. In addition, the method for configuring the RRC state based user-inactivity timer (e.g., radio tail) can apply the short radio tail by reducing the RRC idle-to-connected delay.

In one embodiment of the present invention, the method for switching from the RRC connected (active) state to the RRC inactive state or RRC idle state (mode) may be carried out by the autonomous RRC state transition operation of the terminal according to a configuration of the base station and/or by operating in accordance with a new timer defined for switching to the RRC inactive (or idle) state. In one embodiment, there may be provided a method of designing and configuring events for switching from the RRC connected state to the RRC inactive state or the RRC idle state (mode).

As more detailed operations, it is possible to configure two inactive timers for switching from the RRC connected state to the RRC inactive state or the RRC idle state. As an associated operation between the two inactivity timers, the two timers can be reset at the same time when traffic arrives, or the second timer can be started after expiration of the first timer when traffic arrives.

In one embodiment of the present invention, an event trigger condition and/or a cycle for RRC state switching from the RRC connected state or the RRC idle (or inactive) state can be set for the terminal, and RRC state transitions can be made correspondingly.

In one embodiment of the present invention, when the connection is recovered from the RRC inactive state to the RRC connected (active) state, idle mobility information may be sent as a portion of the terminal feedback to the base station.

In general, the RRC resume procedure in the RRC state transition process, the RRC reconfiguration procedure, and the RRC re-establishment procedure may be the same procedure. The RRC reconfiguration procedure including the RRC resume procedure (switching from the RRC inactive state to the RRC connected state) and the RRC suspend procedure (switching from the RRC connected state to the RRC inactive state) proposed in the present invention can be equally applied to the RRC re-establishment procedure, which is activated when a handover failure (HOF) or a radio link failure (RLF) occurs in a situation where the terminal and the base station have or do not have the UE context.

Next, a detailed description is given of the embodiments of the present invention.

FIG. 1 illustrates the architecture of a communication system according to an embodiment of the present invention.

With reference to FIG. 1, the next generation base station (new radio node B (NR NB) or gNB (NR node B)) 120, 123, 125 or 127 may be connected with a terminal (or user equipment (UE)) 110 via a wireless channel, and it can perform a more complex function in comparison to the node B of the universal mobile telecommunication system (UMTS) or the eNodeB (evolved node B, eNB) of the long term evolution (LTE) system.

In the mobile communication system, as all user traffic including a real-time service such as VoIP (voice over IP) is served through a shared channel, a scheduling apparatus is required that collects state information regarding the buffer state, available transmission power state, and channel state of each terminal 110. The gNB 120, 123, 125 or 127 performs this scheduling function. In general, each gNB 120, 123, 125 or 127 may control a plurality of cells.

The serving gateway (S-GW) 140 is an entity providing data bearers, and may generate or remove a data bearer under the control of the mobility management entity (MME) 130. The MME 130 is an entity that performs various control functions including mobility management for the terminal 110, and may be connected with the plural gNBs 120, 123, 125 and 127.

Although not shown, the mobile communication system according to an embodiment of the present invention may include a new radio core network (NR CN). The NR CN may include an access and mobility management function (AMF), a user plane function (UPF), a session management function (SMF), and the like. Here, the AMF and the UPF may perform some functions of the MME 130, and the SMF and the UPF may perform some functions of the S-GW 140.

Figure 2:
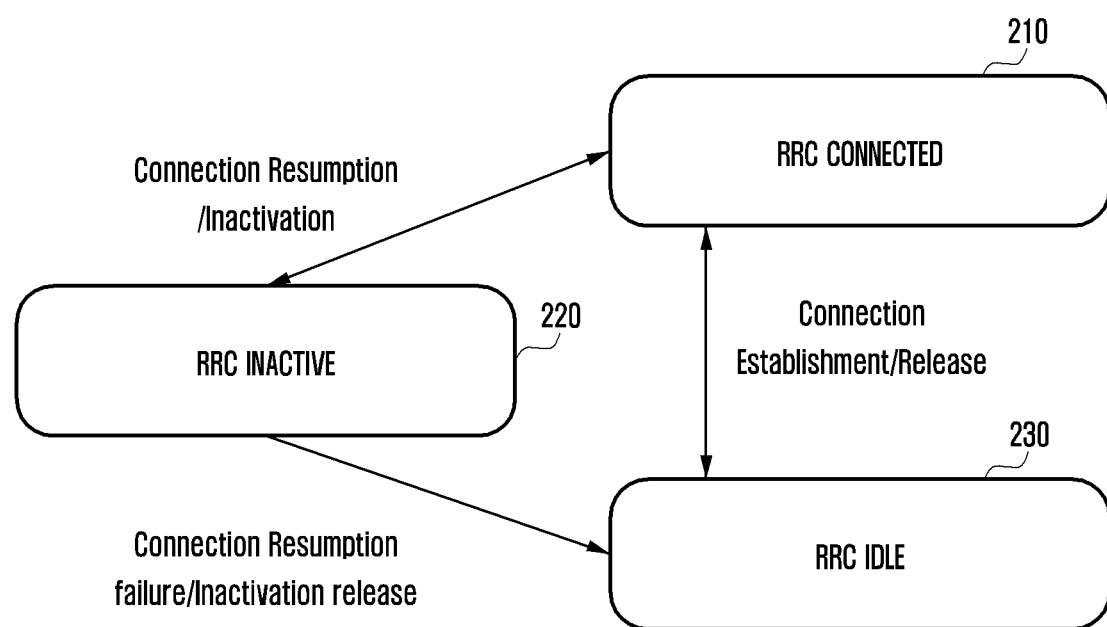
FIG. 2 depicts three RRC states and transitions therebetween in the communication system according to an embodiment of the present invention.

FIG. 2 depicts three RRC states and transitions therebetween in the communication system according to an embodiment of the present invention.

FIG. 2 shows three RRC states (RRC connected state 210, RRC inactive state 220, and RRC idle state 230) and transitions therebetween, which are applicable in the communication system according to an embodiment of the present invention. As shown in FIG. 2, in the communication system according to an embodiment of the present invention, the RRC inactive state 220 is added to the RRC connected state 210 and the RRC idle state 230, so that three RRC states can be used.

For example, switching from the RRC connected state 210 to the RRC inactive state 220 may be caused by a connection inactivation message or a connection deactivation message, and switching from the RRC inactive state 220 to the RRC connected state 210 may be caused by a connection resumption message or a connection activation message. Switching from the RRC connected state 210 to the RRC idle state 230 may be caused by a connection release message, and switching from the RRC idle state 230 to the RRC connected state 210 may be caused by a connection establishment message. Switching from the RRC inactive state 220 to the RRC idle state 230 may be caused by a connection resumption failure message, and switching from the RRC idle state 230 to the RRC inactive state 220 may be caused by an inactive release message.

Although not shown, switching from the RRC inactive state 220 to the RRC idle state 230 or switching from the RRC idle state 230 to the RRC inactive state 220 may be not directly performed. For example, the RRC state may be changed from the RRC inactive state 220 to the RRC connection state 210 and then to the RRC idle state 230, and may be changed from the RRC idle state 230 to the RRC connection state 210 and then to the RRC inactive state 220.

Figure 3:
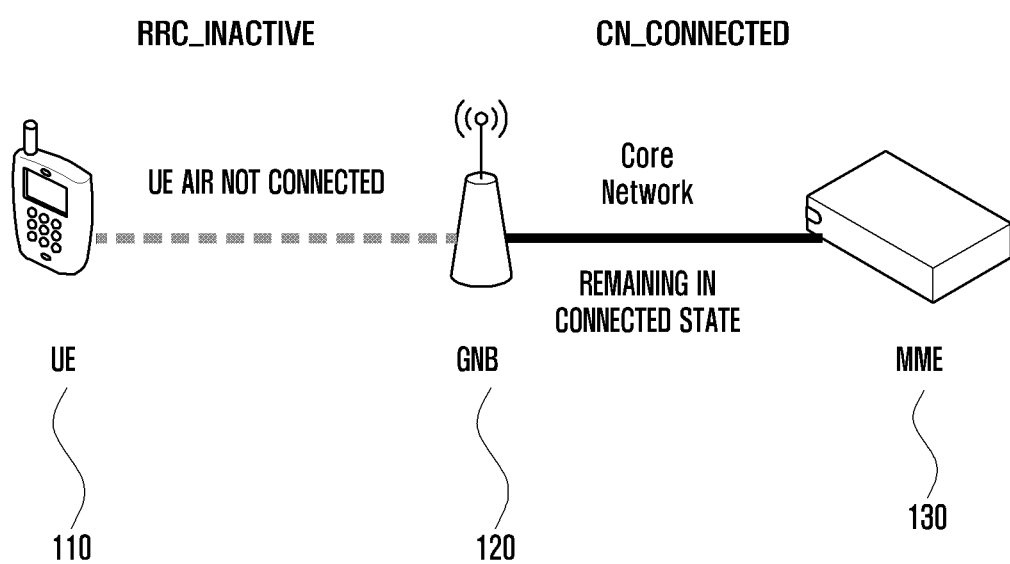
FIG. 3 illustrates an ECM_CONNECTED state where the connection between the base station and the core network is maintained even if the radio link between the terminal and the base station is released and the RRC inactive state is entered in the communication system according to an embodiment of the present invention.

FIG. 3 illustrates an ECM_CONNECTED state where the connection between the base station and the core network is maintained even if the radio link between the terminal and the base station is released and the RRC inactive state is entered in the communication system according to an embodiment of the present invention.

With reference to FIG. 3, in the RRC inactive state being a new RRC state, while the air interface between the terminal 110 and the base station 120 is disconnected, the base station 120 and the core network 130 (e.g., MME) may remain in the connected state. Although the terminal 110 releases the RRC connected state with the base station 120, the base station 120 and the MME 130 may be in the ECM connected state and the UE context may be stored in the base station 120 and the MME 130.

To reduce the transition delay from the RRC idle state to the RRC connected state, it may be necessary to omit the S1 connection setup and security procedures. To this end, the anchor base station (anchor eNB or anchor gNB), which is the base station 120 to which the terminal 110 was connected last, may request the terminal 110 and the base station 120 to store the UE context information including the resume ID for terminal identification.

When the terminal 110 in the RRC inactive state moves and accesses a new base station (gNB) 120, to enable the base station 120 to verify the identity of the terminal 110, the terminal 110 can transmit information thereof (e.g., terminal ID) to the base station 120. Then, the base station 120 to which the terminal 110 is connected (the previous base station when the terminal 110 remains stationary or within the same cell, or the new base station when the terminal 110 is moving) may retrieve the UE context based on the terminal ID and perform the subsequent connection procedure.

Figure 4:
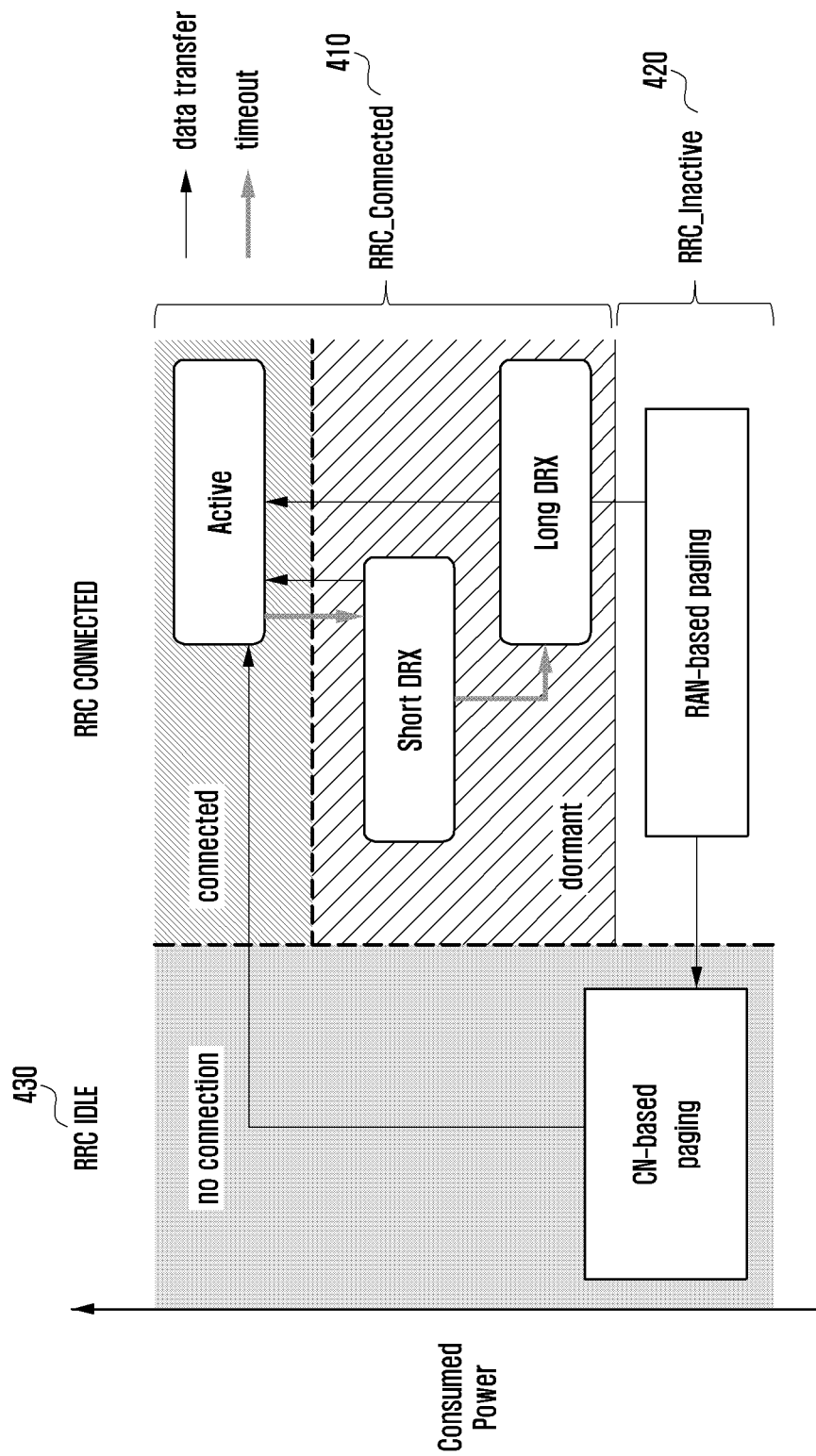
FIG. 4 shows an example of transitions between RRC states according to an embodiment of the present invention.

FIG. 4 shows an example of transitions between RRC states according to an embodiment of the present invention.

With reference to FIG. 4, the base station 120 may transmit the terminal 110 target RRC state information including the RRC state type and transitions to be applied. Here, the communication system according to an embodiment of the present invention may manage three RRC states including the RRC connected state 410, the RRC inactive state 420, and the RRC idle state 430. The RRC connection between the terminal 110 and the base station 120 can remain in one RRC state at a time.

The transitions between these three RRC states includes those transitions between the two LTE RRC states (i.e., RRC idle state 430 and RRC connected state 410) and may further include the following state transitions involving the newly added RRC inactive state 420.

For example, when the first timer expires in the RRC connected (active) state 410, a short DRX cycle may be applied and the second timer may be started. When data transmission occurs during the short DRX cycle, the first timer and the second timer may be reset. When the second timer expires during the short DRX cycle, a long DRX cycle may be applied and a transition may be made to the RRC inactive state 420. At this time, the third timer can be started. When data transmission occurs in the RRC inactive state 420, the first timer, the second timer, and the third timer may be reset and a transition may be made to the RRC connected (active) state 410. Then, if a specific condition is satisfied in the RRC inactive state 420 (e.g., expiration of the third timer, or RAN (base station) based paging), a transition may be made to the RRC idle state 430. When data is generated or paging of the core network occurs in the RRC idle state 430, a transition may be made to the RRC connected state 410.

Next, a description is given of transitions between the three RRC states.

Figure 5:
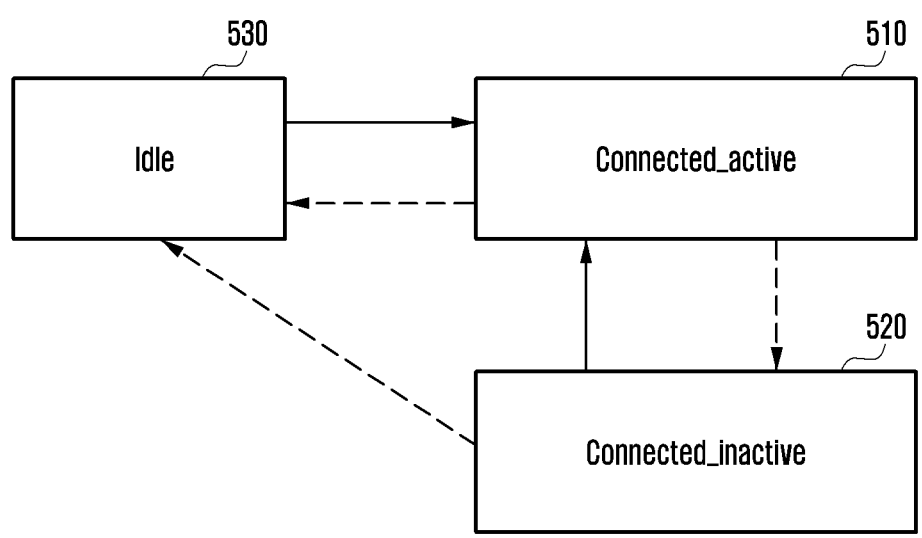
FIG. 5 shows an example of transitions between three RRC states.

FIG. 5 shows an example of transitions between three RRC states.

FIG. 5 shows a case where all state transitions are allowed between the RRC connected (active) state 510 and the RRC inactive state 520, between the RRC connected (active) state 510 and the RRC idle state 530, and between the RRC inactive state 520 and the RRC idle state 530.

When all state transitions are allowed between the RRC connected state 510 and the RRC inactive state 520, between the RRC connected state 510 and the RRC idle state 530, and between the RRC inactive state 520 and the RRC idle state 530, the following event-based operations for RRC state transitions are possible.

1) Upon initial connection, the terminal 110 may make a transition from the RRC idle state 530 to the RRC connected (active) state 510.

2) When a reference timer (e.g., UE_inactivity_timer_inactive, or traffic timer), which is started at the time when last traffic arrived, expires as an event, a transition may be made from the RRC connected (active) state 510 to the RRC inactive state 520.

3) When new traffic arrives while the terminal 110 is in the RRC inactive state 520, a transition may be made from the RRC inactive state 520 to the RRC connected state 510. When new traffic arrives while the terminal 110 is in the RRC idle state 530, a transition may be made from the RRC idle state 530 to the RRC connected state 510.

4) If the terminal 110 is powered off or the terminal 110 is outside the cell coverage of the base station for the corresponding service when the terminal 110 is in the RRC connected state 510, a transition may be made from the RRC connected state 510 to the RRC idle state 530. Alternatively, if the above event occurs when the terminal 110 is in the RRC inactive state 520, a transition may be made from the RRC inactive state 520 to the RRC idle state 530.

Figure 6:
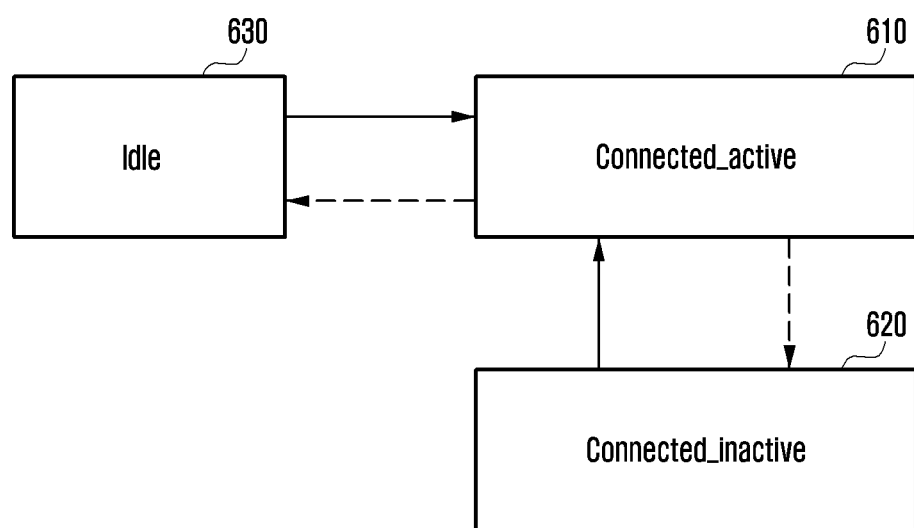
FIG. 6 shows another example of transitions between three RRC states.

FIG. 6 shows another example of transitions between three RRC states.

In FIG. 6, state transitions between the RRC connected (active) state 610 and the RRC inactive state 620 and state transitions between the RRC connected state 610 and the RRC idle state 630 may be allowed. A direct state transition between the RRC inactive state 620 and the RRC idle state 630 is not allowed, and a state transition between the RRC inactive state 620 and the RRC idle state 630 may be supported through a state transition from the RRC inactive state 620 or the RRC idle state 630 to the RRC connected state 610.

1) Upon initial connection, the terminal 110 may make a transition from the RRC idle state 630 to the RRC connected (active) state 610.

2) When a reference timer (e.g., UE_inactivity_timer_inactive, or traffic timer), which is started at the time when last traffic arrived, expires as an event, a transition may be made from the RRC connected (active) state 610 to the RRC inactive state 620.

3) When new traffic arrives while the terminal 110 is in the RRC inactive state 620, a transition may be made from the RRC inactive state 620 to the RRC connected state 610. When new traffic arrives while the terminal 110 is in the RRC idle state 630, a transition may be made from the RRC idle state 630 to the RRC connected state 610.

4) If the terminal 110 is powered off or the terminal 110 is outside the cell coverage of the base station for the corresponding service when the terminal 110 is in the RRC connected state 610, a transition may be made from the RRC connected state 610 to the RRC idle state 630. Alternatively, if the above event occurs when the terminal 110 is in the RRC inactive state 620, a transition may be made from the RRC inactive state 620 to the RRC connected state 610 and another transition may be made to the RRC idle state 630.

Figure 7:
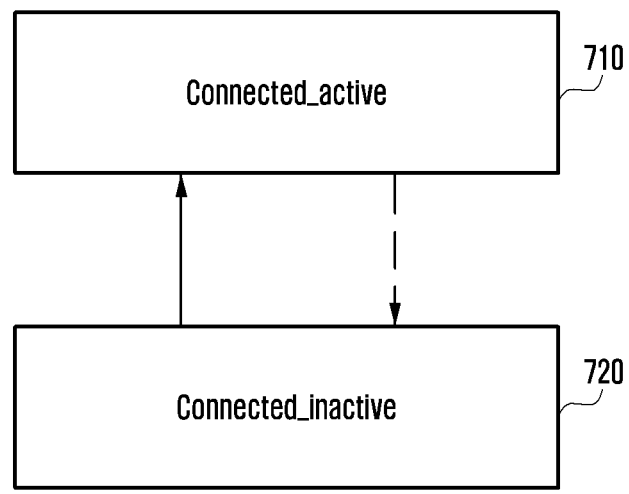
FIG. 7 shows another example of transitions between three RRC states.

FIG. 7 shows another example of transitions between three RRC states.

In FIG. 7, only state transitions between the RRC connected (active) state 710 and the RRC inactive state 720 are allowed. As there is no transition to the RRC idle state (not shown) except for a certain situation, state transitions between the RRC connected state 710 and the RRC idle state and between the RRC inactive state 720 and the RRC idle state may be limited.

1) Upon initial connection, the terminal 110 may make a transition from the RRC inactive state 720 to the RRC connected (active) state 710. Here, the stored UE context may be not terminal-specific information (e.g., UE-specific UE context information) but may be common configuration information (e.g., network-specific UE context information) commonly used in the network supporting the corresponding service.

2) When a reference timer (e.g., UE_inactivity_timer_inactive, or traffic timer), which is started at the time when last traffic arrived, expires as an event, a transition may be made from the RRC connected state 710 to the RRC inactive state 720.

3) When new traffic arrives, the terminal 110 may make a transition from the RRC inactive state 720 to the RRC connected state 710. Alternatively, when new traffic arrives, the terminal 110 may make a transition from the RRC idle state (not shown) to the RRC connected state 710.

4) If the terminal 110 is powered off or the terminal 110 is outside the cell coverage of the base station for the corresponding service when the terminal 110 is in the RRC connected state 710, a transition may be made from the RRC connected state 710 to the RRC inactive state 620. Alternatively, if the above event occurs when the terminal 110 is in the RRC inactive state 720, a transition may be made from the RRC inactive state (storing terminal-specific UE context information) to the RRC inactive state (storing network-specific UE context information).

Meanwhile, the RRC state type and associated event triggers to be applied to the terminal 110 determined by the base station 120 can be configured or transmitted to the terminal 110 in the following ways.

1) At the time of initial setup of the terminal link (e.g., link setup, or switching to the RRC connected state), the base station 120 may configure or deliver information associated with the RRC state configuration and event triggering rule to be applied to the terminal 110 to the terminal 110 by use of an RRC configuration message.

2) At any time when the base station 120 detects a change of RRC state application criteria, the base station 120 may configure or deliver information associated with the RRC state configuration and event triggering rule to be applied to the terminal 110 to the terminal 110 by use of an RRC reconfiguration message.

3) At the time of RRC connection release, the base station 120 may configure or deliver information associated with the RRC state configuration and event triggering rule to be applied to the terminal 110 to the terminal 110 by use of an RRC release message.

Figure 8:
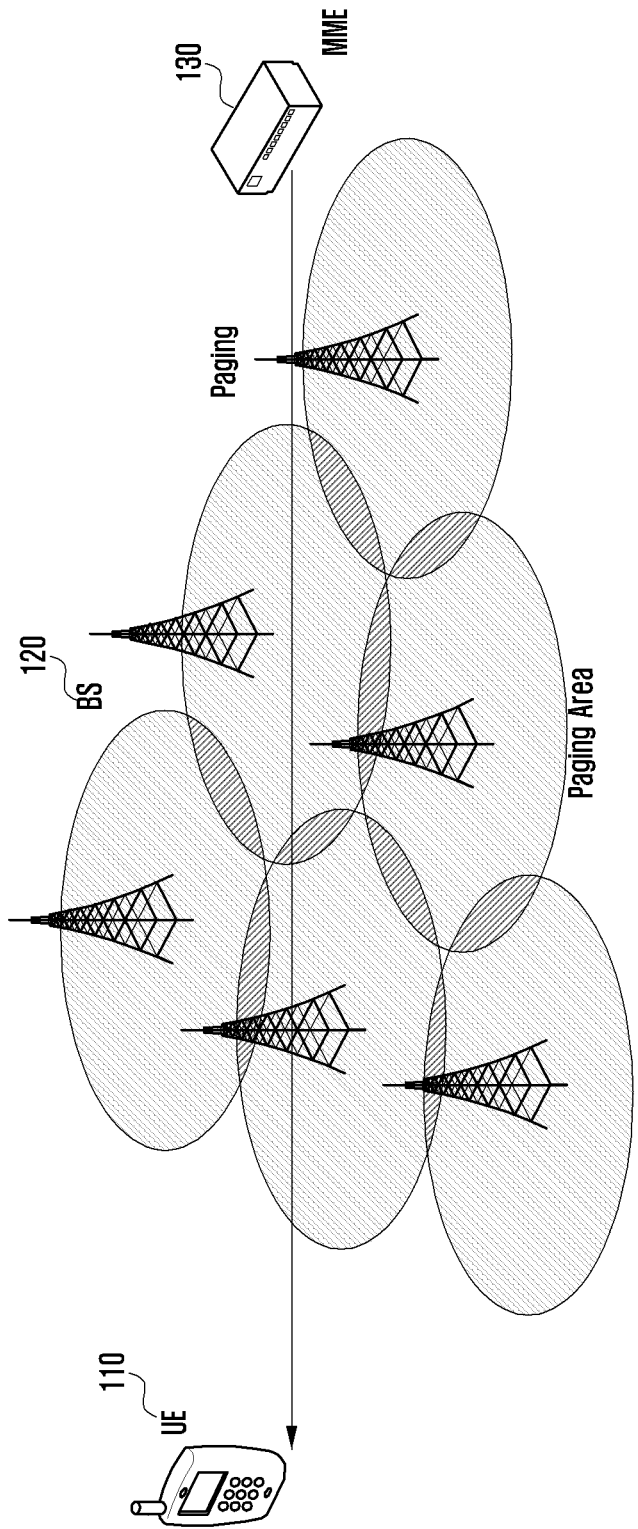
FIG. 8 shows an example of determining whether to apply the RRC inactive state when the terminal is moved at a low speed in the communication system according to an embodiment of the present invention.

FIG. 8 shows an example of determining whether to apply the RRC inactive state when the terminal is moved at a low speed in the communication system according to an embodiment of the present invention.

With reference to FIG. 8, in the communication system according to the embodiment of the present invention, to improve the power efficiency of the terminal 110, the base station 120 may determine whether to apply the RRC inactive state in a situation where the traffic load is high when the terminal 110 moves at a low speed.

To determine whether to apply the RRC inactive state to the terminal 110, the base station 120 may consider the mobile environment, the cell coverage of the network, the mobility of the terminal, and the traffic load. Here, the traffic load may be caused by the presence of control signaling (e.g., paging, and tracking area (TA) update) for controlling cell switching, update of the core network (CN) paging area, and update of the RAN-based paging area. It may be advantageous to apply the RRC inactive state, for example, when the cell coverage of the network is wide, when the terminal is moving at a low speed, or when the traffic load for controlling cell switching, CN paging area update, and RAN-based paging area update is low.

In the communication system according to an embodiment of the present invention, the network (base station) 120 may determine whether to apply the RRC inactive state in consideration of a control signal transmission method for supporting mobility and the mobility support option of the terminal 110 available in the RRC inactive state.

More specifically, the base station 120 can measure the CN control signaling load associated with CN-based paging transmission, RAN-based paging transmission, tracking area update, and/or RAN-based paging area update according to the configuration option for mobility support available in the RRC inactive state. Here, the CN control signaling can be transmitted through the S1 interface and the X2 interface. The base station 120 can determine whether to apply the RRC inactive state to the corresponding cell based on the CN control signaling load per unit time.

For example, if the control signaling load for CN-based paging or CN-based paging area update (TAU) is higher than the control signaling load for RAN-based paging or RAN-based paging area update (PAU), the base station 120 may determine to apply the RRC inactive state in the corresponding network or cell. In one embodiment, the base station 120 may increase the ratio of RRC inactive state application by adjusting the parameters related to the RRC state transition, e.g., the UE_inactivity_timer or RRC state transition events.

In another embodiment, if the per-unit-time CN control signaling load associated with CN-based paging or CN-based tracking area update (TAU), the per-unit-time CN control signaling load associated with RAN-based paging, or RAN-based paging area update (PAU), or a combination thereof is above a preset threshold, the base station 120 may apply the RRC inactive state.

Meanwhile, the following criteria may be used to determine whether to apply the RRC inactive state to a terminal.

1) Cell environment: in consideration of the cell coverage and the number of cells in the paging area, the base station can determine whether to apply the RRC inactive state to each terminal.

2) Base station: in consideration of the average traffic load and the paging load, the base station can determine whether to apply the RRC inactive state to each terminal.

3) Terminal mobility indicator: in consideration of the number of handovers (reflecting the cell radius and the moving speed), e.g., counted number of RRC (re)configuration with mobility information, the base station can determine whether to apply the RRC inactive state to each terminal.

Figure 9B:
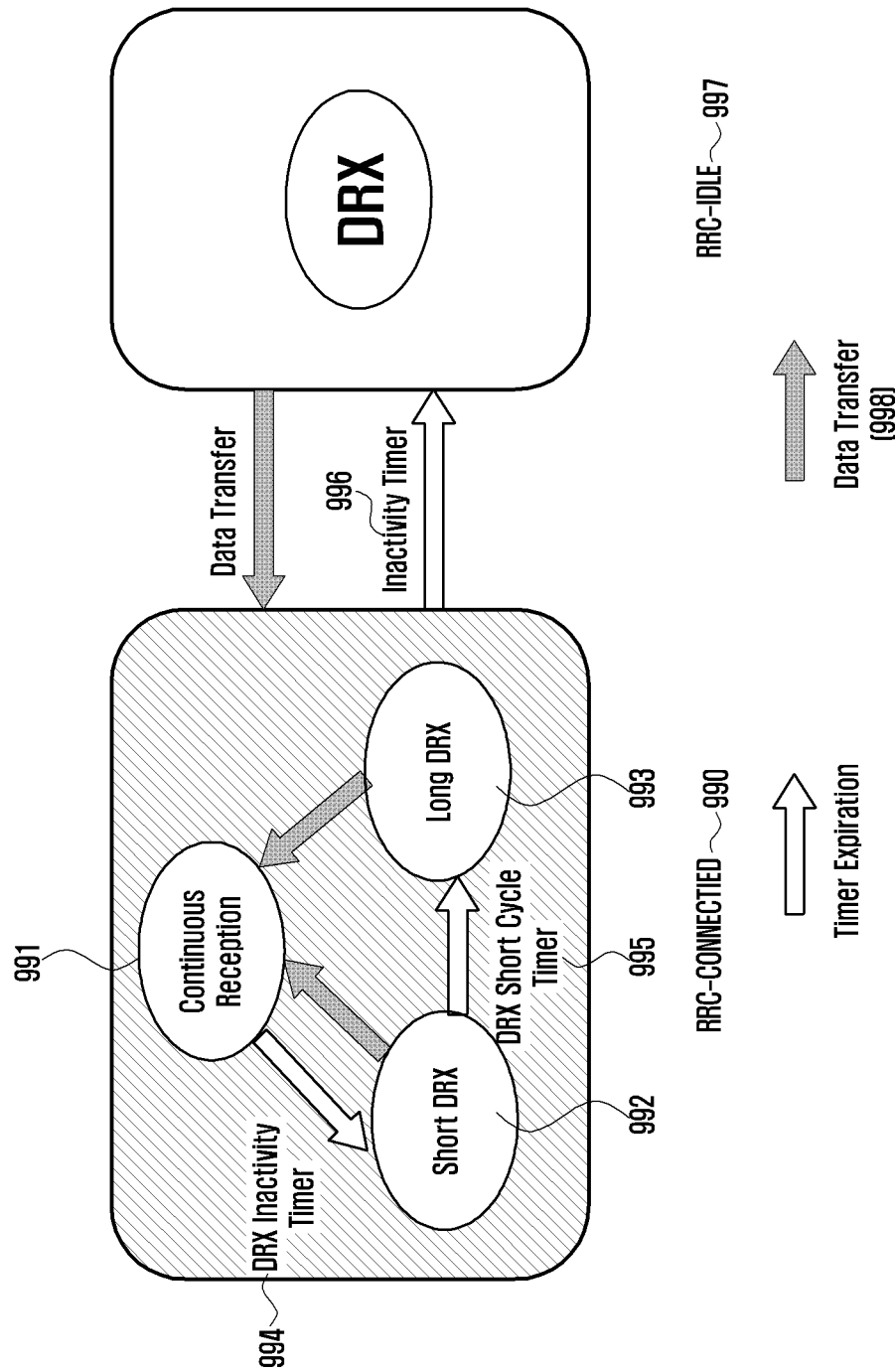
FIG. 9B shows an example of RRC state transitions in the LTE communication system.

FIG. 9A illustrates a procedure for determining the RRC state to be applied and controlling the radio tail in the communication system according to an embodiment of the present invention. FIG. 9B shows an example of RRC state transitions in the LTE communication system.

With reference to FIG. 9A, in one embodiment of the present invention, the RRC inactive state may be applied to a low mobility terminal 110 and a short radio tail (timer like a user-inactivity timer) may be set. The method for configuring the RRC state based user-inactivity timer (radio tail) may include applying a short radio tail when the RRC inactive state is applied, and applying a short radio tail as part of reduction in delay when switching from the RRC idle state to the RRC connected state.

The RRC state transition timer may operate in the following two ways depending on whether data is transmitted in the corresponding state. The timer may be reset (i.e., re-set to 0) when data is transmitted, or the timer is triggered (i.e., timer being started) when data is not transmitted, and switching may be initiated when the reference timer for the RRC state transition expires. In addition, the timers can be classified and applied differently according to each RRC state transition criterion.

With reference to FIG. 9B, in the existing LTE (4G) system, for switching from the RRC connected state (990) in which data transmission is possible to the RRC idle state (997), the transition from the continuous transition and reception mode 991 to the C-DRX (connected DRX) mode 992 and 993 may be made on the basis of the DRX inactivity timer 994, and the transition from the C-DRX mode 992 and 993 to the RRC idle state 997 may be made on the basis of the user-inactivity-timer 996. Here, the user-inactivity-timer 996 is a timer implemented by the base station. When the user-inactivity-timer 996 expires, the base station 120 transmits an RRC release message to the terminal 110 and makes a transition to the RRC idle state 997.

The DRX inactivity timer 994 serving as a reference for switching from the continuous reception mode 991 to the short DRX mode 992 and the DRX short cycle timer 995 for switching from the short DRX mode 991 to the long DRX mode 992 are timers operating in the base station 120 and the terminal 110, and the base station 120 can configure the terminal 110 with these timers via an RRC (re)configuration message. More specifically, parameters related with low power operation can be described as Tables 1 to 4 below with reference to the RRC layer standard document 3GPP TS 36.331.

TABLE 1

MAC-MainConfig field descriptions drx-Config
Used to configure DRX as specified in TS 36.321 [6]. E-UTRAN configures the values in DRX-Config-v1130 only if the UE indicates support for IDC indication. E-UTRAN configures drx-Config-v1130 only if drx-Config (without suffix) is configured.
drx-InactivityTimer
Timer for DRX is TS 36.321 [6]. Value in number of PDCCH sub-frames. Value psf1 corresponds to 1 PDCCH sub-frame. psf2 corresponds to 2 PDCCH sub-frames and so on.
drx-RetransmissionTimer
Timer for DRX in TS 36.321 [6]. Value in number of PDCCH sub-frames. Value psf1 corresponds to 1 PDCCH sub-frame. psf2 corresponds to 2 PDCCH sub-frames and so on. In case drx-RetransmissionTimer-v1130 is signalled, the UE shall ignore drx-RetransmissionTimer (i.e. without suffix).

TABLE 1-continued

MAC-MainConfig field descriptions drxShortCycleTimer
Timer for DRX in TS 36.321 [6]. Value in multiples of shortDRX-Cycle. A value of 1 corresponds to shortDRX-Cycle, a value of 2 corresponds to 2* shortDRX-Cycle and so on.

TABLE 2

```
DRX-Config ::=                              CHOICE {
        release                             NULL,
        setup                               SEQUENCE {
                onDurationTimer                 ENUMERATED {
                                                    psf1, psf2, psf3, psf4, psf5, psf6,
                                                    psf8, psf10, psf20, psf30, psf40,
                                                    psf50, psf60, psf80, psf100,
                                                    psf200},
                drx-InactivyTimer               ENUMERATED {
                                                    psf1, psf2, psf3, psf4, psf5, psf6,
                                                    psf8, psf10, psf20, psf30, psf40,
                                                    psf50, psf60, psf80, psf100,
                                                    psf200, psf300, psf500, psf750,
                                                    psf1280, psf1920, psf2560, psf0-v1020,
                                                    spare9, spare8, spare7, spare6,
                                                    spare5, spare4, spare3, spare2,
                                                    spare1},
                drx-RetransmissionTimer         ENUMERATED {
                                                    psf1, psf2, psf3, psf4, psf6, psf8, psf16,
                                                    psf24, psf33},
                longDRX-CycleStartOffset    CHOICE {
                        sf10                    INTEGER(0..9),
                        sf20                    INTEGER(0..19),
                        sf32                    INTEGER(0..31),
                        sf40                    INTEGER(0..39),
                        sf64                    INTEGER(0..63),
                        sf80                    INTEGER(0..79),
                        sf128                   INTEGER(0..127),
                        sf160                   INTEGER(0..159),
                        sf256                   INTEGER(0..255),
                        sf320                   INTEGER(0..319),
                        sf512                   INTEGER(0..511),
                        sf640                   INTEGER(0..639),
                        sf1024                  INTEGER(0..1023),
                        sf1280                  INTEGER(0..1279),
                        sf2048                  INTEGER(0..2047),
                        sf2560                  INTEGER(0..2559)
                },
                shortDRX                    SEQUENCE {
                        shortDRX-Cycle          ENUMERATED {
                                                    sf2, sf5, sf8, sf10, sf16, sf20,
                                                    sf32, sf40, sf64, sf80, sf128, sf160,
                                                    sf256, sf320, sf512, sf640},
                        drxShortCycleTimer      INTEGER (1..16)
                }   OPTIONAL                            -- Need OR
        }
}
DRX-Config-v1130 ::=                        SEQUENCE {
        drx-RetransmissionTimer-v1130           ENUMERATED {psf0-v1130}   OPTIONAL, --
Need OR
        longDRX-CycleStartOffset-v1130          CHOICE {
                sf60-v1130                      INTEGER(0..59),
                sf70-v1130                      INTEGER(0..69)
        }                                       OPTIONAL,   --Need OR
        shortDRX-Cycle-v1130                    ENUMERATED (sf4-v1130}   OPTIONAL   --Need
OR
}
```

TABLE 3

RRM-Config field descriptions ue-InactiveTime
Duration while UE has not received or transmitted any user data. Thus the timer is still running in case e.g.. UE measures the neighbour cells for the HO purpose. Value s1 corresponds to 1 second, s2 corresponds to 2 seconds and so on. Value min1 corresponds to 1 minute, value min1s20 corresponds to 1 minute and 20 seconds, value min1s40 corresponds to 1 minute and 40 seconds and so on. Value hr1 corresponds to 1 hour, hr1min30 corresponds to 1 hour and 30 minutes and so on.

TABLE 4

```
-- ASN1START
RRN-Config ::=         SEQUENCE {
            ue-InactiveTime   ENUMERATED {
                        s1, s2, s3, s5, s7, s10, s15, s20,
                        s25, s30, s40, s50, min1, min1s20c, min1s40,
                        min2, min2s30, min3, min3s30, min4, min5, min6,
                        min7, min8, min9, min10, min12, min14, min17,
                        min20,
                        min24, min28, min33, min38, min44, min60, hr1,
                        hr1min30, hr2, hr2min30, hr3, hr3min30, hr4, hr5, hr6,
                        hr8, hr10, hr13, hr16, hr20, day1, day1hr12, day2,
                        day2hr12, day3, day4, day5, day7, day10, day14,
                        day19,
                        day24, day30, dayMoreThan30}   OPTIONAL,
....
```

Here, the DRX_inactivity_timer, the DRX_short_cycle_timer and the user-inactivity-timer may be triggered to start when the last traffic arrived at the terminal 110 and the base station 120, and may be reset to zero later when new traffic arrives at the terminal 110 and the base station 120. When the timer expires, a corresponding RRC state transition may be made to the short DRX mode 992, the long DRX mode 993, or the RRC idle state 997.

In one embodiment, for switching from the RRC connected state in which data transmission is possible to the RRC inactive state, the DRX_inactivity_timer 994 may be started when the last traffic arrived at the terminal 110 and the base station 120; when the DRX_inactivity_timer 994 expires, the short DRX mode 992 may be started; and when the DRX_short_Cycle_timer 995 expires, the long DRX mode 993 may be started.

The user-Inactivity-timer_INACTIVE may be started when the last traffic arrived, and may be reset to 0 (restarting) when new traffic arrives at the terminal 110 and the base station 120. Later, when the user-Inactivity-timer_INACTIVE expires, the terminal 110 and/or the base station 120 may make an RRC state transition to the RRC inactive state.

In one embodiment, switching from the RRC connected state to the RRC inactive state may be achieved through 1) 1-step RRC messaging (e.g., RRC release), or 2) 2-step RRC messaging (e.g., RRC connection reconfiguration and RRC connection reconfiguration complete). Alternatively, the terminal 110 may autonomously make a transition from the RRC connected state to the RRC inactive state based on the user-Inactivity-timer_INACTIVE previously set by the base station 120 without RRC signaling from the base station 120.

In another embodiment, for switching from the RRC inactive state in which there is no data transmission to the RRC idle state, as traffic is not transmitted, it is necessary to specify separate criteria and events for changing the RRC state from the RRC inactive state to the RRC idle state. The criteria and events for changing the RRC state from the RRC inactive state to the RRC idle state may be, for example, as follows.

If RAN-based location area update (RLAU) is not performed until a threshold time passes from the time when periodic RAN-based paging update is to be performed and the timer T_periodic_PAU expires, a transition may be made to the RRC idle state.

If the RLAU procedure fails (failure of RLAU complete procedure), a transition may be made to the RRC idle state.

If a threshold time elapses after switching from the RRC connected state to the RRC inactive state, a transition may be made to the RRC idle state.

If the UE context information has lost its validity (e.g., the valid time of the configured UE context has elapsed), or if the UE context is out of the valid area (e.g., UE_Resume_ID is moved outside its designated area), a transition may be made to the RRC idle state.

If the validity time of the security key stored in the UE context has elapsed, a transition may be made to the RRC idle state.

If the terminal fails to find a suitable cell, a transition may be made to the RRC idle state.

If the terminal is out of the service coverage, a transition may be made to the RRC idle state.

If other RAT is reselected, a transition may be made to the RRC idle state.

When CN initiating paging is received, a transition may be made to the RRC idle state.

If (re)activate or resume operation for switching from the RRC inactive state to the RRC connected state fails, a transition may be made to the RRC idle state.

If all radio bearers are released, a transition may be made to the RRC idle state.

If there is a mismatch between the AS (access stratum) information and the NAS (non-access stratum) information (including state or security information) of the terminal, a transition may be made to the RRC idle state.

In addition, when the subscriber identity module (SIM) card of the terminal 110 is removed while the terminal 110 is in the RRC inactive state, a transition may be made from the RRC inactive state to the RRC idle state.

Switching from the RRC inactive state to the RRC idle state may be achieved through 1) 1-step RRC messaging (e.g., RRC Connection release), or 2) 2-step RRC messaging (e.g., RRC connection reconfiguration and RRC connection reconfiguration complete). Alternatively, the terminal 110 may make a transition from the RRC inactive state to the RRC idle state based on the event criteria or timers in the configuration parameters previously set by the base station 120 without RRC signaling from the base station 120.

The terminal 110 and/or the base station 120 may explicitly notify the release cause of switching from the RRC inactive state to the RRC idle state through an RRC message. For example, when a transition is made from the RRC inactive state to the RRC idle state, the corresponding reason may be included in the "Release Cause value" field of an RRC message, which is transmitted to the terminal 110 and/or the base station 120. Here, the RRC message may be sent through 1) 1-step RRC messaging (e.g., RRC Connection release), or 2) 2-step RRC messaging (e.g., RRC connection reconfiguration and RRC connection reconfiguration complete).

Table 5 illustrates detailed causes for switching from the RRC inactive state to the RRC idle state described in the field "Release Cause value" of an RRC connection release message.

TABLE 5

| RRCConnectionRelease message |
| --- |
| RRCConnectionRelease::= SEQUENCE { <br>    rrc-LightConnectionIndication         ENUMERATED {true}         OPTIONAL, -- Need OR <br>    ran-PagingConfig                      RAN-PagingConfig         OPTIONAL, -- Need ON <br>    nonCriticalExtension                  SEQUENCE { }             OPTIONAL <br>    ReleaseCause ::=                      ENUMERATED {periodic RLAU, RLAU failure, getting out of service, <br>                                          reselecting to other RAT, CN initiating paging, <br>            Failure of(re)activate or resume, releasing all the radio bearers,UE AS and NAS mismatch <br>                                          } <br>} <br>RAN-PagingConfig::=              SEQUENCE { <br>    ran-PagingCycle              ENUMERATED {  rf32, rf64, rf128, rf256}    OPTIONAL, -- Need OR <br>    ran-PagingAreaInfo           RAN-PagingAreaInfo                          OPTIONAL, -- Need ON <br>    ran-PeriodicPAU              ENUMERATED {min5, min10, min30, min60, <br>                                            min120, min360, min720, infinity}    OPTIONAL, -- Need OP   ... <br>} <br>RAN-PagingAreaInfo       ::= CHOICE { <br>            ran-pagingAreaCellList                  SEQUENCE (SIZE (1..maxRanPagingCells)) OF CellIdentity, <br>            trackingArea                            ENUMERATED {true},     ... <br>}} |

In one embodiment, the field "Release Cause value" of an RRC connection release message for switching from the RRC inactive state to the RRC idle state may indicate activation failure for any reason or some other cause only. This is illustrated in Table 6.

TABLE 6

| RRCConnectionRelease message |
| --- |
| RRCConnectionRelease::= SEQUENCE { <br>    rrc-LightConnectionIndication    ENUMERATED {true}           OPTIONAL, -- Need OR <br>    ran-PagingConfig                 RAN-PagingConfig     OPTIONAL, -- Need ON <br>    nonCriticalExtension                   SEQUENCE { }            OPTIONAL <br>    ReleaseCause ::=                 ENUMERATED { RRC connection failure, other} <br>} <br>RAN-PagingConfig::=              SEQUENCE { <br>    ran-PagingCycle              ENUMERATED { rf32, rf64, rf128, rf256}        OPTIONAL, - Need OR <br>    ran-PagingAreaInfo           RAN-PagingAreaInfo                            OPTIONAL, -- Need ON <br>    ran-PeriodicPAU              ENUMERATED (min5, min10, min30, min60, <br>                                            min120, min360, min720, infinity} <br>                                 OPTIONAL, -- Need OP   ... <br>} <br>RAN-PagingAreaInfo       ::= CHOICE { <br>            ran-pagingAreaCellList                  SEQUENCE (SIZE (1..maxRanPagingCells)) OF CellIdentity, <br>            trackingArea                            ENUMERATED {true},     ... <br>}} |

When a specific event occurs while the terminal 110 is in the RRC connected state, a transition can be made directly from the RRC connected state to the RRC idle state. Examples of such an event may be as follows.

If the terminal 110 fails to find a suitable cell, a transition can be made to the RRC idle state.

If the terminal 110 is out of the service coverage, a transition can be made to the RRC idle state.

If another RAT is reselected, a transition can be made to the RRC idle state.

If all radio bearers are released, a transition can be made to the RRC idle state.

If there is a mismatch between the AS information and the NAS information (including state or security information) of the terminal 110, a transition may be made to the RRC idle state.

Switching from the RRC connected state to the RRC idle state may be achieved through 1) 1-step RRC messaging (e.g., RRC release), or 2) 2-step RRC messaging (e.g., RRC connection reconfiguration and RRC connection reconfiguration complete). Alternatively, the terminal 110 may make a transition from the RRC connected state to the RRC idle state based on the event criteria or timers in the configuration parameters previously set by the base station 120 without RRC signaling from the base station 120.

The terminal 110 and/or the base station 120 may explicitly notify the release cause of switching from the RRC connected state to the RRC idle state through an RRC message. For example, when a transition is made from the RRC connected state to the RRC idle state, the corresponding reason may be included in the "Release Cause value" field of an RRC message, which is transmitted to the terminal 110 and/or the base station 120. Here, the RRC message may be sent through 1) 1-step RRC messaging (e.g., RRC Connection release), or 2) 2-step RRC messaging (e.g., RRC connection reconfiguration and RRC connection reconfiguration complete).

Table 7 illustrates detailed causes for switching from the RRC connected state to the RRC idle state described in the field "Release Cause value" of an RRC connection release message.

TABLE 7

RRCConnectionRelease message

```
RRCConnectionRelease::=             SEQUENCE {
                rrc-LightConnectionIndication       ENUMERATED {true}                       OPTIONAL, --
Need OR
                CN-PagingConfig                     CN-PagingConfig                         OPTIONAL, -- Need
ON
                nonCriticalExtension                SEQUENCE { }                            OPTIONAL
                ReleaseCause ::=                    ENUMERATED (periodic RLAU, RLAU failure, getting out
of service,
                                                                        Reselecting to other RAT, CN initiating
paging,
                                Failure of (re)activate or resume, releasing all the radio bearers,UE AS and
NAS mismatch
                                                    }
}
CN-PagingConfig::=                  SEQUENCE {
                CN-PagingCycle                      ENUMERATED {  rf32, rf64, rf128, rf256}  OPTIONAL, --
Need OR
                CN-PagingAreaInfo                   CN-PagingAreaInfo                       OPTIONAL, -- Need ON
                CN-PeriodicPAU                      ENUMERATED {min5, min10, min30, min60,
                                                                        min120, min360, min720, infinity}
                                                    OPTIONAL, -- Need OP   ...
}
CN-PagingAreaInfo                           ::= CHOICE {
                                    CN-pagingAreaCellList                       SEQUENCE (SIZE
(1..maxCNPagingCells)) OF CellIdentity,
                                    trackingArea                ENUMERATED {true},              ...
                }}
```

In one embodiment, the field "Release Cause value" of an RRC connection release message for switching from the RRC connected state to the RRC idle state may indicate activation failure for any reason or some other cause only. This is illustrated in Table 8.

TABLE 8

RRCConnectionRelease message

```
RRCConnectionRelease::=             SEQUENCE {
                rrc-LightConnectionIndication       ENUMERATED {true}       OPTIONAL, -- Need
OR
                CN-PagingConfig                     CN-PagingConfig         OPTIONAL, -- Need ON
                nonCriticalExtension                SEQUENCE { }            OPTIONAL
                ReleaseCause ::=                    ENUMERATED { RRC connection failure, other}
}
```

TABLE 8-continued

RRCConnectionRelease message

```
CN-PagingConfig::=                            SEQUENCE {
                CN-PagingCycle       ENUMERATED { rf32, rf64, rf128, rf256}     OPTIONAL, --
Need OR
                CN-PagingAreaInfo    CN-PagingAreaInfo              OPTIONAL, -- Need ON
                CN-PeriodicPAU       ENUMERATED {min5, min10, min30, min60,
                                                    min120, min360, min720, infinity}
                                     OPTIONAL, -- Need OP   ...
}
CN-PagingAreaInfo                    ::= CHOICE {
                            CN-pagingAreaCellList            SEQUENCE (SIZE
(1..maxCNPagingCells)) OF CellIdentity,
                        trackingArea                ENUMERATED {true},    ...
                    }}
```

As the latency to the start of data transmission/reception (QoS satisfaction) in the low power mode of the terminal 110 changes according to the RRC state configuration and procedures applied to the terminal 110, the connection standby time (user-inactivity timer, CP tail, or radio tail) of the terminal 110 can be controlled. For example, the connection standby time (user-inactivity timer, CP tail, or radio tail) of the terminal 110 can be controlled according to 1) switching from the RRC idle state to the RRC connected (active) state, 2) switching from the RRC inactive state to the RRC connected state, or 3) switching from the RRC idle state to the RRC inactive state first and then switching to the RRC connected (active) state.

When switching between the RRC states is directed by a command or message from the base station 120, the connection standby time (user-inactivity timer, CP tail, or radio tail) of the terminal 110 may be set 1) as implementation values of the base station 120. In addition, 2) switching between the RRC states may be initiated by internal timers of the terminal 110 according to the pre-configured information of the base station 120.

Here, the base station 120 can use control signaling to notify the terminal 110 of the connection standby time (connection-inactivity timer, CP tail, or radio tail) determined according to the RRC state configuration and procedures.

To configure the terminal 110 with the connection standby time (connection-inactivity timer, CP tail, or radio tail) determined according to the RRC state configuration and procedures, 1) the base station 120 may determine the RRC state configuration and procedures, determine the connection standby time of the terminal 110 based on the RRC state configuration and procedures, and explicitly configure the terminal 110 with the determined value or index via an RRC (re)configuration message or the like. Or, 2) the base station 120 may determine the RRC state configuration and procedures, configure the terminal 110 with the RRC state configuration and procedures, determine the connection standby time of the terminal 110, and implicitly configure the terminal 110 with the connection standby time via an RRC (re)configuration message or the like.

In one embodiment, when the base station 120 applies the RRC inactive state to the terminal 110, the short radio tail can be configured and applied due to reduced delay of switching from the RRC inactive state to the RRC connected state.

More specifically, with reference to FIG. 9A, at step 910, the MIME 130 and the base station 120 may remain in the ECM connected state. At step 920, traffic may be loaded to the base station 120.

At step 930, the base station 120 may transmit an RRC configuration message to the terminal 110. Here, the RRC configuration message may include information regarding a UE mobility threshold and the connection standby time (inactivity timer T_xyz, user-inactivity timer, CP tail, or radio tail) of the terminal 110 for applying the RRC inactive state. In addition, the terminal 110 may determine whether it is a low-mobility terminal on the basis of the UE mobility threshold. If the terminal 110 is a low-mobility terminal, the base station 120 may configure the terminal 110 to apply the RRC inactive state.

After completion of the RRC configuration, at step 940, the base station 120 may transmit data traffic to the terminal 110.

At step 950, the terminal 110 may determine whether it is a low mobility terminal and the connection standby time (inactivity timer T_xyz) has expired according to the information set at step 930.

If the terminal 110 is a low mobility terminal and the connection standby time has expired, at step 960, the terminal 110 may make a transition to the RRC inactive state. Thereafter, at step 970, no control signaling may be transmitted between the terminal 110 and the base station 120. At step 980, the MME 130 may keep the UE context including security information even at the RRC inactive state.

Figure 10:
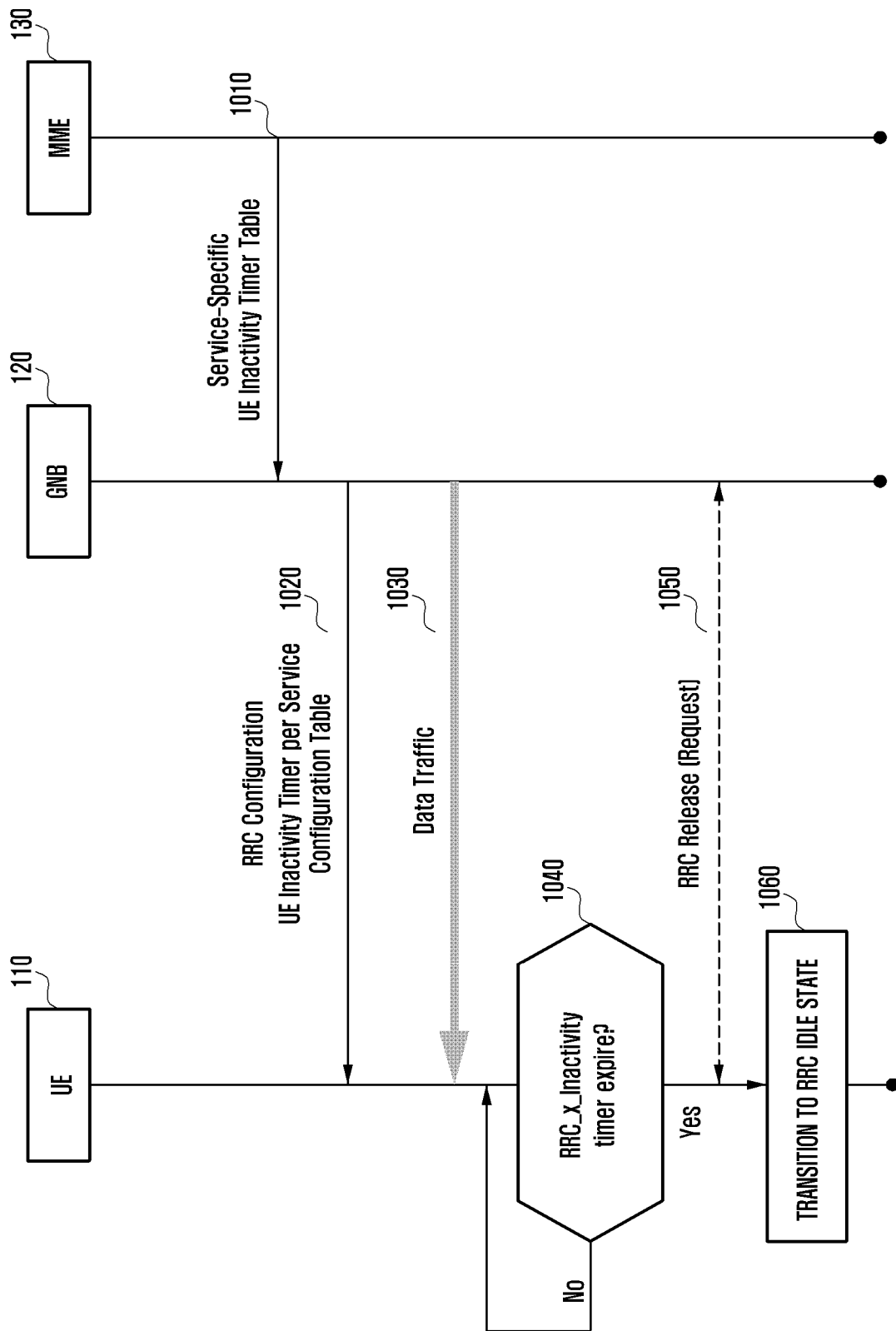
FIG. 10 depicts a procedure for transitions between RRC states in the communication system according to an embodiment of the present invention.

FIG. 10 depicts a procedure for transitions between RRC states in the communication system according to an embodiment of the present invention.

Switching between the RRC states can be made according to the following options as shown in Table 9.

For example, 1) RRC state transitions may be made according to an RRC state transition control message from the base station 120 (control signaling from network to UE). More specifically, whenever an RRC state transition event occurs, the base station 120 may transmit a control signal to the terminal 110 to control the terminal 110 to change the RRC state.

Or, 2) for some RRC state transitions (e.g., switching from the RRC connected (active or inactive) state to the RRC idle state), whenever a transition event occurs, the base station 120 may transmit a control signal to the terminal 110 to control the terminal 110 to change the RRC state. In addition, for some other RRC state transitions (e.g., switching from the RRC connected active state to the RRC inactive state), when a transition event occurs, without a control signal transmitted from the base station 120, the terminal 110 may automatically make a transition between the RRC states based on its internal timers according to the configuration information set in advance by the base station 120.

Or, 3) for all RRC state transitions, the terminal 110 may automatically make a transition between the RRC states based on its internal timers according to the configuration information set in advance by the base station 120.

That is, with reference to Table 9 below, switching between the RRC states can be initiated by a command/message from the base station 120 via control signaling related with transitions between the RRC states.

Alternatively, the terminal 110 may make a transition between the RRC states based on its internal timers according to the configuration information set in advance by the base station 120. Here, 1) when an event occurs for switching between the RRC states, an RRC state transition can be made in the terminal 110 without an explicit control signal. In this case, it may be difficult for the base station 120 to identify the release of the RRC state of the terminal 110, but the base station 120 may infer the RRC state of the terminal 110 from the UE inactivity timer. Alternatively, 2) when an event occurs for a transition between the RRC states, the terminal 110 may transmit an RRC state transition report message (e.g., UE RRC state report) to the base station 120 and make an RRC state transition. Alternatively, 3) when an event occurs for a transition between the RRC states, the terminal 110 may transmit an RRC state transition report message (e.g., RRC state transition report) to the base station 120 and receive a confirmation message (e.g., RRC state transition response) from the base station 120 first, and then make an RRC state transition.

sage to the terminal 110. Here, the RRC configuration message may include information on the inactivity timer.

After completion of the RRC configuration, at step 1030, the base station 120 may transmit data traffic to the terminal 110.

At step 1040, the terminal 110 may determine whether the inactivity timer has expired according to the information configured at step 1020.

If the inactivity timer has expired, at step 1060, the terminal 110 can make a transition to the RRC idle state (or RRC inactive state). In one embodiment, the terminal 110 may perform an RRC release operation with the base station 120 via RRC signaling with the base station 120 at step 1050.

Figure 11:
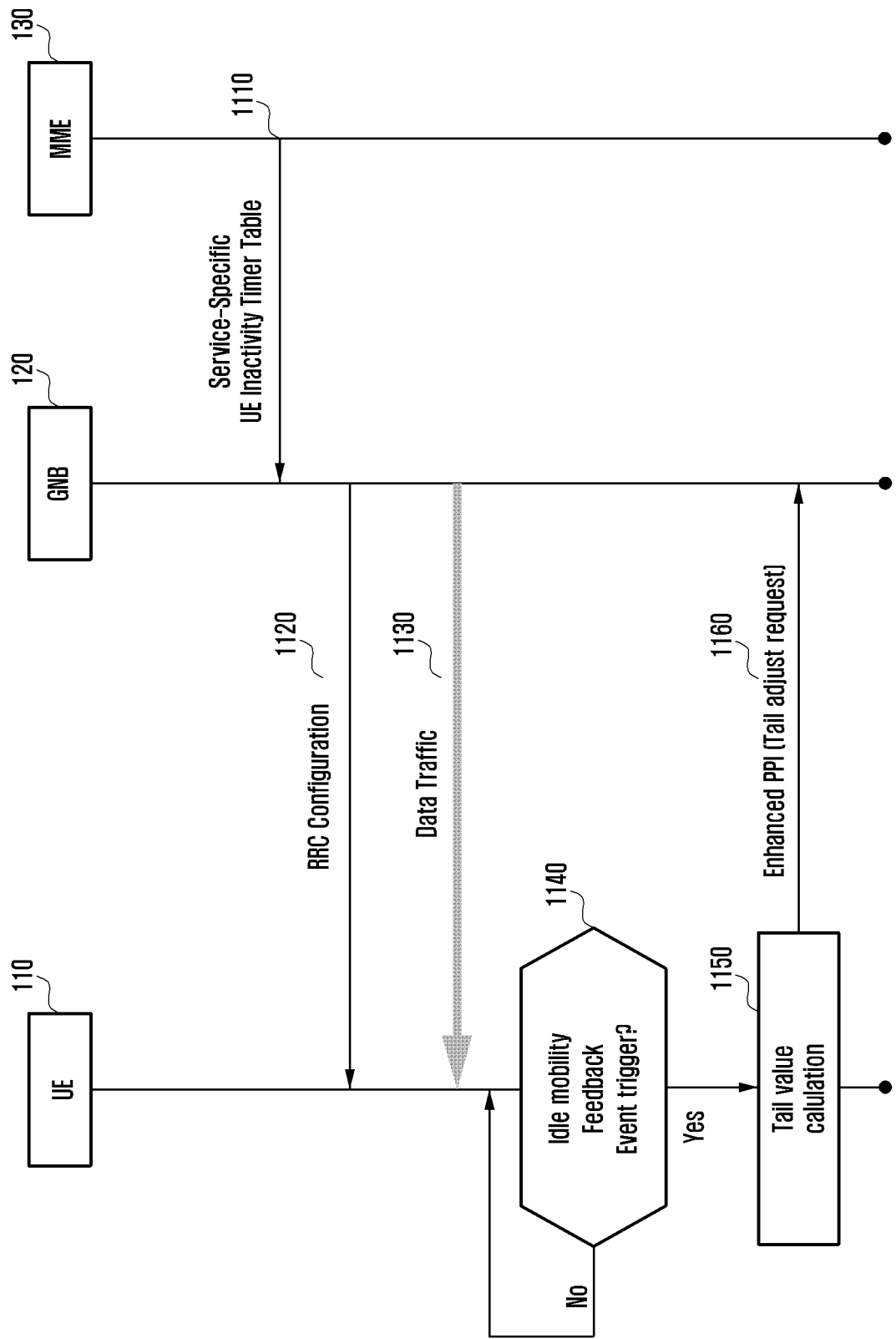
FIG. 11 depicts a procedure for configuring the connection standby time of the terminal in the communication system according to an embodiment of the present invention.

FIG. 11 depicts a procedure for configuring the connection standby time of the terminal in the communication system according to an embodiment of the present invention.

With reference to FIG. 11, the terminal 110 may assist the network (i.e., base station 120) to determine the RRC state application and cyclic prefix (CP) tail by feedbacking additional information. For example, if it is necessary to update the CP tail information, an enhanced power preference indicator (enhanced PPI) may be sent via a service type index update operation between the terminal 110 and the base station 120. Specifically, the existing 1-bit PPI may be extended to 4 bits, and the terminal 110 may transmit information on the recommended radio tail values to the

TABLE 9

| Options | | Description | Characteristics |
|---|---|---|---|
| Existing LTE scheme (based on network control signal) | | BS explicitly sends RRC signal to UE | Network (BS) always sends RRC connection release message |
| UE starts operation (based on network control settings) | 1) no RRC signal | No RRC control signal required | Difficult for BS to identify UE's release of RRC state (inference based on UE inactivity timer) |
| | 2) One way | Send one control signal for confirmation UE RRC state report | Easy for BS to identify UE's release of RRC state |
| | 3) two way | Send two control signals for confirmation UE: RRC state transition report BS: RRC state transition response | Easy for BS to identify UE's release of RRC state Easy for UE to identify BS's reception of buffer data |

With reference to FIG. 10, in the communication system according to an embodiment of the present invention, the connection standby time (user-inactivity timer, CP tail, or radio tail) of the terminal 110 is configured according to the RRC state configuration and procedures, the terminal 110 can automatically make an RRC state transition based on its internal timers according to the settings of the base station 120.

More specifically, at step 1010, the MME 130 may transmit a UE inactivity timer table to the base station 120. The above table may include information about, for example, the inactivity timer (connection standby time) applicable for each service, and timers for switching between the RRC states. That is, the table may include information regarding an inactivity timer for switching from the RRC active state to the RRC inactive state, an inactivity timer for switching from the RRC active state to the RRC idle state, and an inactivity timer for switching from the RRC inactive state to the RRC idle state. At step 1020, the base station 120 may transmit an RRC configuration mesbase station 120 by using the 4-bit enhanced PPI. As it is advantageous for cross-layer information parsing of the terminal, the additional information transmitted by the terminal 110 to the base station 120 as feedback can be configured according to the following criterion. To this end, information signaling can be performed through the interface between the application processor (AP) and the communication processor (CP) in the terminal 110. The above criterion may include traffic QoS (RAN slice) information (e.g., uplink traffic), PDCP (packet data convergence protocol) information (e.g., radio bearer), MAC (medium access control) information (e.g., LCP (link control protocol)), TCP (transmission control protocol) information (e.g., TCP flag), or APP (application) information, or a combination thereof.

As shown in FIG. 11, in the communication system according to an embodiment of the present invention, it is possible to configure the connection standby time (user-inactivity timer, CP tail, or radio tail) of the terminal 110 determined based on the RRC state configuration and procedures.

More specifically, at step 1110, the MME 130 may transmit a UE inactivity timer table to the base station 120. The above table may include information about, for example, the inactivity timer (connection standby time) applicable for each service, and timers for switching between the RRC states. That is, the table may include information regarding an inactivity timer for switching from the RRC active state to the RRC inactive state, an inactivity timer for switching from the RRC active state to the RRC idle state, and an inactivity timer for switching from the RRC inactive state to the RRC idle state. At step 1120, the base station 120 may transmit an RRC configuration message to the terminal 110. Here, the RRC configuration message may include information on the inactivity timer.

After completion of the RRC configuration, at step 1130, the base station 120 may transmit data traffic to the terminal 110.

At step 1140, the terminal 110 may determine whether an event to transmit feedback information to the base station 120 has occurred. That is, the terminal 110 may determine whether it is necessary to update the ratio tail.

The terminal 1150 may calculate the radio tail value at step 1150, and may transmit information on the calculated value to the base station 120 at step 1160. Here, as described above, information on the radio tail value and/or information requesting adjustment of the radio tail value may be included in the enhanced PPI for transmission.

Figure 12:
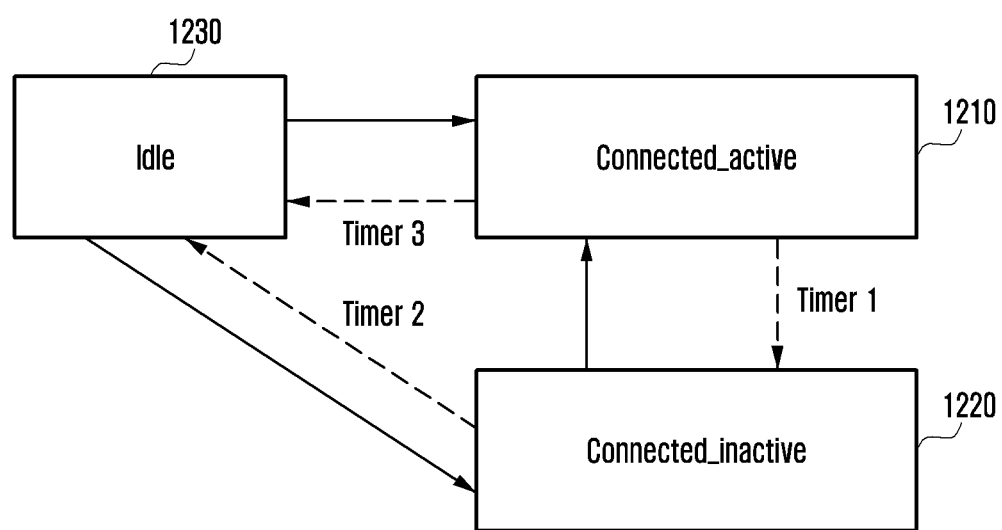
FIG. 12 shows an example in which the terminal performs an RRC state transition operation based on timers for switching from the RRC connected state to the RRC idle state (or RRC inactive state) and switching from the RRC inactive state to the RRC idle state in the communication system according to an embodiment of the present invention.
Figure 13:
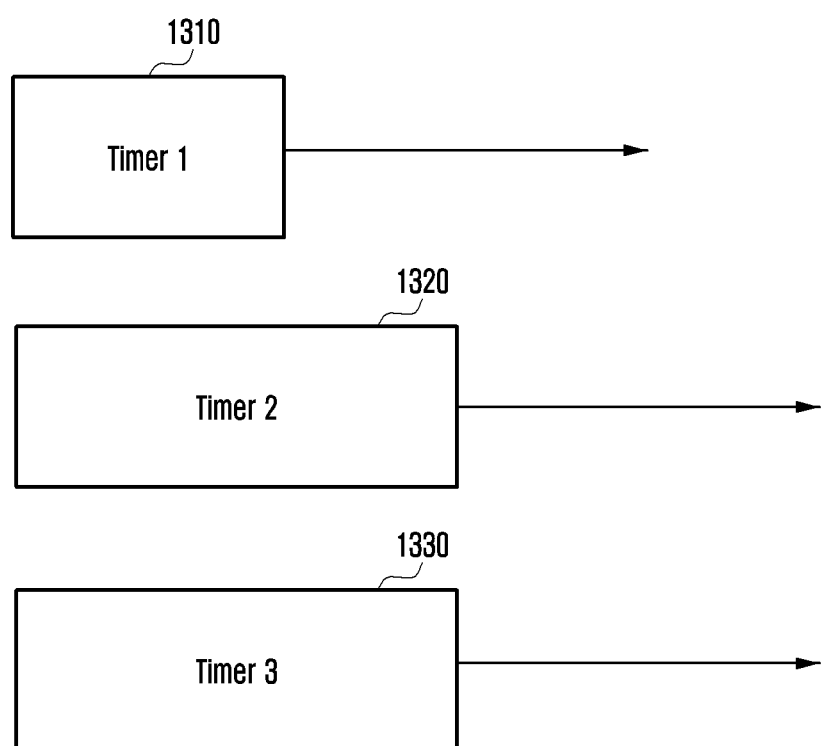
FIG. 13 illustrates a case where three inactivity timers are separately configured to control switching from the RRC connected state to the RRC idle state (or RRC inactive state) and switching from the RRC inactive state to the RRC idle state in the communication system according to an embodiment of the present invention.
Figure 14:
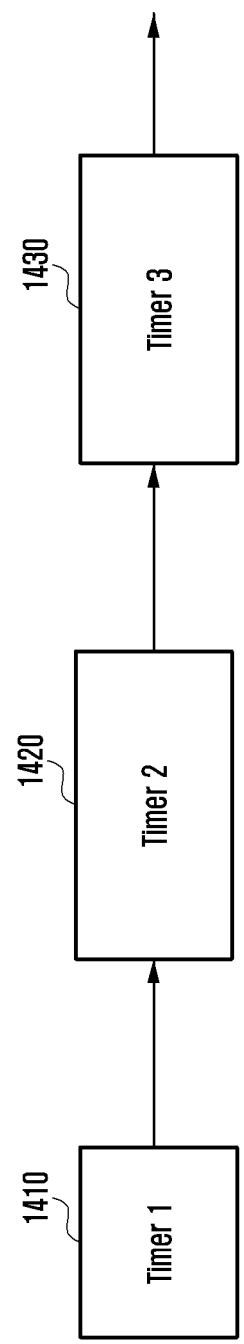
FIG. 14 illustrates a case where three inactivity timers are sequentially configured to control switching from the RRC connected state to the RRC idle state (or RRC inactive state) and switching from the RRC inactive state to the RRC idle state in the communication system according to an embodiment of the present invention.

FIG. 12 shows an example in which the terminal performs an RRC state transition operation based on timers for switching from the RRC connected state to the RRC idle state (or RRC inactive state) and switching from the RRC inactive state to the RRC idle state in the communication system according to an embodiment of the present invention. FIG. 13 illustrates a case where three inactivity timers are separately configured to control switching from the RRC connected state to the RRC idle state (or RRC inactive state) and switching from the RRC inactive state to the RRC idle state in the communication system according to an embodiment of the present invention. FIG. 14 illustrates a case where three inactivity timers are sequentially configured to control switching from the RRC connected state to the RRC idle state (or RRC inactive state) and switching from the RRC inactive state to the RRC idle state in the communication system according to an embodiment of the present invention.

With reference to FIGS. 12 to 14, when switching from the RRC connected state to the RRC inactive state or the RRC idle state, the terminal 110 can make an autonomous RRC state transition according to the configuration of the base station 120. In one embodiment of the present invention, it may be necessary to define a new timer for switching to the RRC inactive state.

For switching from the RRC connected state to the RRC idle state (or RRC inactive state) and switching from the RRC inactive state to the RRC idle state, the terminal may perform an RRC state transition operation based on timers. In this case, a description is given of the timer configurations and operations of two reference inactivity timers.

The power consumption of the terminal 110 may be increased in the order of the RRC idle state, the RRC inactive state, and the RRC connected state. There may be three inactivity timers that are used as a reference for switching from a relatively active state (i.e., RRC connected state) to an inactive state (i.e., RRC inactive state or RRC idle state). As shown in FIG. 12, switching to a relatively inactive RRC state (i.e., RRC inactive state or RRC idle state) can be performed with three timers for the following three cases.

1) RRC connected (active) state 1210->RRC inactive state 1220: this transition may be made based on timer 1 (e.g., timer 1 may be an Act_Inact inactivity timer).

2) RRC inactive state 1220->RRC idle state 1230: this transition may be made based on timer 2 (e.g., timer 2 may be an Inact_Idle inactivity timer).

3) RRC connected state 1210->RRC idle state 1230: this transition may be made based on timer 3 (e.g., timer 1 may be an Act_Idle inactivity timer).

In one embodiment, some of the three inactivity timers may operate in the base station 120. In another embodiment, some of the three inactivity timers may be configured by the base station 120 to the terminal 110 to enable the terminal 110 to automatically make an RRC state transition.

For example, if an event occurs for a specific RRC state transition (e.g., switching from the RRC connected state to the RRC idle state, or switching from the RRC inactive state to the RRC idle state), the base station 120 may transmit a control signal to the terminal 110 to control the terminal 110 to change the RRC state. Alternatively, if an event occurs for a specific RRC state transition (e.g., switching from the RRC connected state to the RRC inactive state), without a control signal transmitted from the base station 120, the terminal 110 may automatically make a transition between the RRC states based on its internal timers according to the configuration information set in advance by the base station 120.

Meanwhile, the user inactivity timer is reset whenever new traffic arrives. When the user inactivity timer expires (i.e., the time corresponding to the timer elapses), the terminal 110 may make a transition to a more inactive RRC state.

Here, the three inactivity timers can be configured independently to operate, or can be configured sequentially to operate.

In FIGS. 13 and 14, the values of the inactivity timers 1310, 1320, 1330, 1410, 1420 and 1430 can be set independently, and can be reset at the same time.

More specifically, 1) the three inactivity timers (timer 1, timer 2, and timer 3) 1310, 1320, 1330, 1410, 1420 and 1430 can be set to separate values. In one embodiment, 2) the three inactivity timers 1310, 1320, 1330, 1410, 1420 and 1430 may be set to the same value. In one embodiment, 3) the three inactivity timers 1310, 1320, 1330, 1410, 1420 and 1430 may be set to multiples of a unit time (e.g., integer multiple of the unit time). In one embodiment, 4) two of the three inactivity timers 1310, 1320, 1330, 1410, 1420 and 1430 may have the same value and the remaining one timer may have a different value.

Meanwhile, the count operation of the three inactivity timers 1310, 1320, 1330, 1410, 1420 and 1430 may correspond to one of the following cases.

1) As shown in FIG. 13, the three inactivity timers 1310, 1320 and 1330 can start the count operation at the same time. When traffic arrives, all the three inactivity timers 1310, 1320 and 1330 can be reset.

2) In one embodiment, among the three inactivity timers 1310, 1320 and 1330, only the inactivity timer corresponding to the current RRC state of the terminal 110 can start the count operation; and when traffic arrives, only the corresponding inactivity timer can be reset. For example, when the terminal 110 is in the RRC inactive state, only timer 1 (Act_Inact inactivity timer) 1310 and timer 2 (1320) serving as a reference for switching from the RRC inactive state to the RRC idle state can perform the count operation.

3) In one embodiment, as shown in FIG. 14, the three inactivity timers 1410, 1420 and 1430 may operate in sequence. For example, timer 2 (1420) may start after timer 1 (1410) expires, and timer 3 (1430) may start after timer 2 (1420) expires.

Meanwhile, if the metric (criterion) for determining the RRC state application of the terminal 110 in the RRC inactive state or the RRC idle state is changed, the terminal 110 may feedback this information to the base station 120. More specifically, the following criteria may be used to determine the RRC state application for each terminal.

1) Cell environment: in consideration of the coverage per cell and the number of cells in the paging area, the base station can determine the RRC state application for the terminal.

2) Base station: in consideration of the average traffic load and the paging load, the base station can determine the RRC state application for the terminal.

3) Terminal mobility indicator: by use of the number of handovers (reflecting the cell radius and the moving speed) (e.g., counted number of RRC (re)configuration with mobility information), the base station can determine the RRC state application for the terminal.

In one embodiment, when the movement speed of the terminal 110 is changed during the RRC idle mobility, the terminal 110 may feedback this change information to the base station 120. Then, the base station 120 can change the RRC state configuration and transition rules for the terminal, and change the event design and configuration scheme for switching from the RRC connected state to the RRC inactive state or the RRC idle state.

When restoring the connection through switching from the RRC inactive state or the RRC idle state to the RRC connected state, if information for the RRC state transition condition is required, the terminal 110 transmits feedback information such as idle mobility information to the base station 120, and the base station 120 can update the state transition condition.

When the metric used as a criterion for determining the RRC status application is changed in the terminal 110, the terminal 110 may feedback the corresponding information to the base station 120 when the connection is restored through switching from the RRC connected inactive state or the RRC idle state to the RRC connected (active) state. Here, such feedback information can be transmitted in a new field of a message such as an RRC request message, a random access (RACH) message, or a scheduling request (SR) message.

Figure 15:
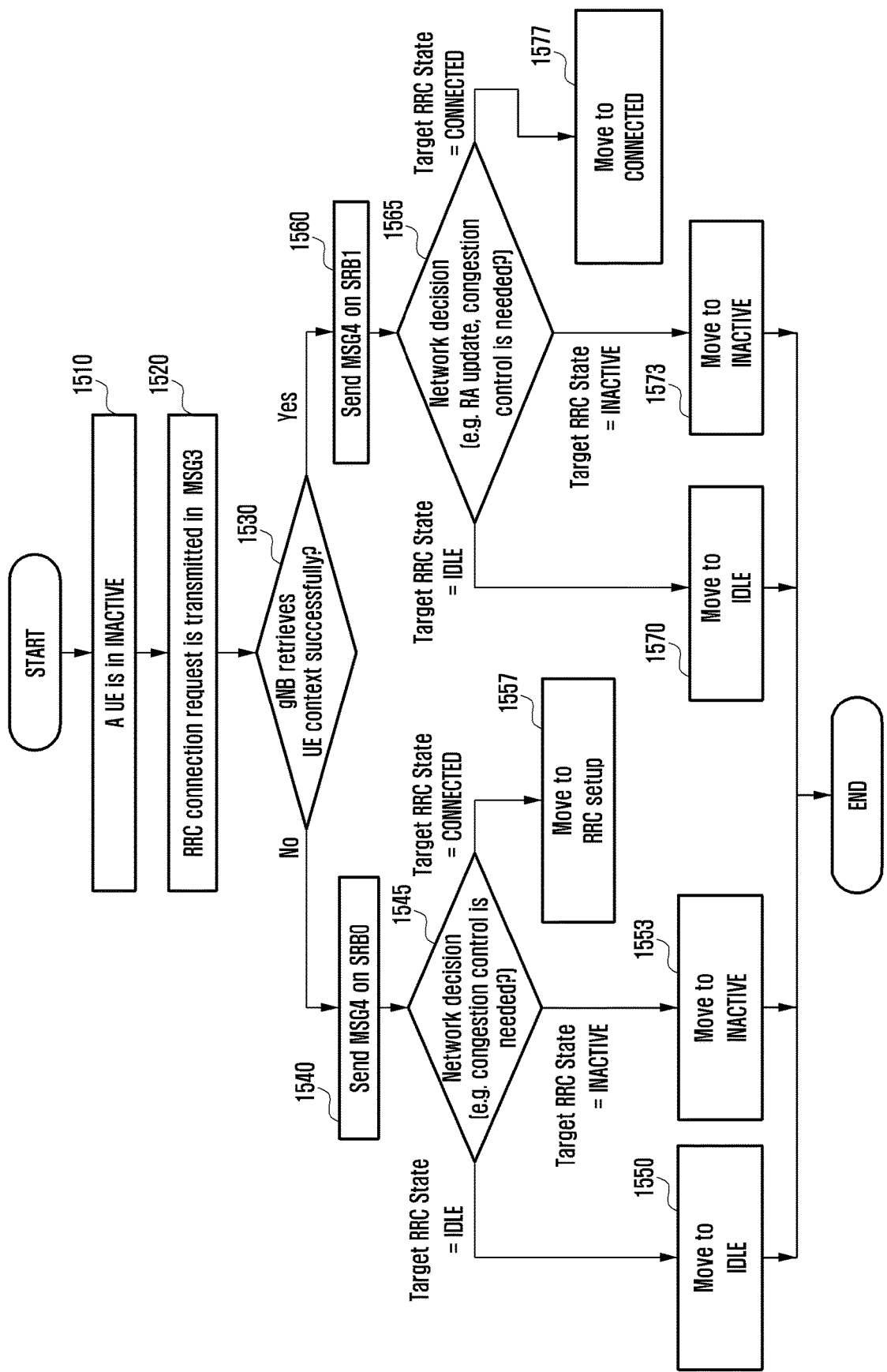
FIG. 15 depicts a procedure for the base station to make an RRC state transition according to an embodiment of the present invention.

FIG. 15 depicts a procedure for the base station to make an RRC state transition according to an embodiment of the present invention.

With reference to FIG. 15, the base station 120 may make an RRC state transition based on the congestion level thereof and whether the UE context is successfully retrieved. This will be described in more detail.

In the following description, the base station to which the terminal 110 was connected in the previous RRC connected state can be referred to as an anchor base station. When the terminal 110 makes a transition to the RRC inactive state, the terminal 110 and the anchor base station can store the UE context. On the other hand, when the terminal 110 makes a transition from the RRC inactive state to the RRC connected state, the base station to which the terminal 110 makes an RRC connection request can be referred to as a target base station.

At step 1510, the terminal 110 may be in the RRC inactive state. For switching from the RRC inactive state to the RRC connected state, at step 1520, the terminal 110 may transmit an RRC connection request to the target base station 120 via the random access channel (RACH) message (message 3, MSG3). Here, the terminal 110 may transmit the MSG3 to the target base station 120 via signaling radio bearer 0 (SRB0) without applying the security key for the target base station 120 to the MSG3.

Upon receiving the MSG3 including the RRC connection request, at step 1530, the target base station 120 may forward the UE context to the anchor base station indicated by UE_resume_ID based on the UE context in the RRC connection request. The target base station 120 may determine whether the UE context is successfully retrieved.

If the UE context is successfully retrieved, at step 1560, the target base station 120 may apply its new security key and send an RRC connection response message (MSG4) to the terminal 110 via SRB1.

If the target base station 120 has failed to retrieve the UE context from the anchor base station, at step 1540, as a security key cannot be applied, the target base station 120 may transmit the MSG4 (RRC connection response) to the terminal 110 via SRB0.

In the meantime, the target base station 120 can control the RRC state transition of the terminal 110 by transmitting a RACH MSG4 (RRC connection response) indicating the target RRC state to the terminal 110 according to the network conditions. Here, the target RRC state may be information indicating whether the terminal 110 makes a transition to the RRC idle state, the RRC inactive state, or the RRC connected state. Upon receiving the MSG4 including the target RRC state information, the terminal 110 may determine whether to make a transition to the RRC idle state, the RRC inactive state, or the RRC connected state.

For example, the target base station 120 may determine the target RRC state in consideration of whether congestion control is required and/or whether RA update is required.

If switching to the RRC connected state is not allowed owing to the necessity of congestion control or the like, the target base station 120 may transmit the terminal 110 an RRC connection response indicating that the target RRC state is the RRC inactive state or the RRC idle state via a RACH MSG4. If switching to the RRC connected state is allowed without the necessity of congestion control or the like, the target base station 120 may transmit the terminal 110 an RRC connection response indicating that the target RRC state is the RRC connected state via a RACH MSG4.

At step 1565, the terminal 110 may determine whether target RRC state information is included in the MSG4 transmitted via SRB1 at step 1560. If target RRC state information is included, the terminal 110 can determine to make an RRC state transition according to the target RRC state information. If the target RRC state included in the MSG4 indicates the RRC idle state, at step 1570, the terminal 110 can make a transition to the RRC idle state. If the target RRC state included in the MSG4 indicates the RRC inactive state, at step 1573, the terminal 110 can make a transition to the RRC inactive state. If the target RRC state included in the MSG4 indicates the RRC connected (active) state, at step 1577, the terminal 110 can make a transition to the RRC connected (active) state.

Similarly, at step 1545, the terminal 110 may determine whether target RRC state information is included in the MSG4 transmitted via SRB0 at step 1540. If target RRC state information is included, the terminal 110 can determine to make an RRC state transition according to the target RRC state information. If the target RRC state included in the MSG4 indicates the RRC idle state, at step 1550, the terminal 110 can make a transition to the RRC idle state. If the target RRC state included in the MSG4 indicates the RRC inactive state, at step 1553, the terminal 110 can make a transition to the RRC inactive state.

Here, when the target base station 120 has failed to retrieve the UE context and transmitted an RRC connection response via a RACH MSG4 on SRB0, and the target RRC state is the RRC connected state, as the target base station 120 does not have the UE context, it is not allowed to make a direct transition from the RRC inactive state to the RRC connected state. Hence, at step 1557, the terminal 110 may make a transition from the RRC idle state to the RRC connected state through the RRC setup procedure.

Figure 16:
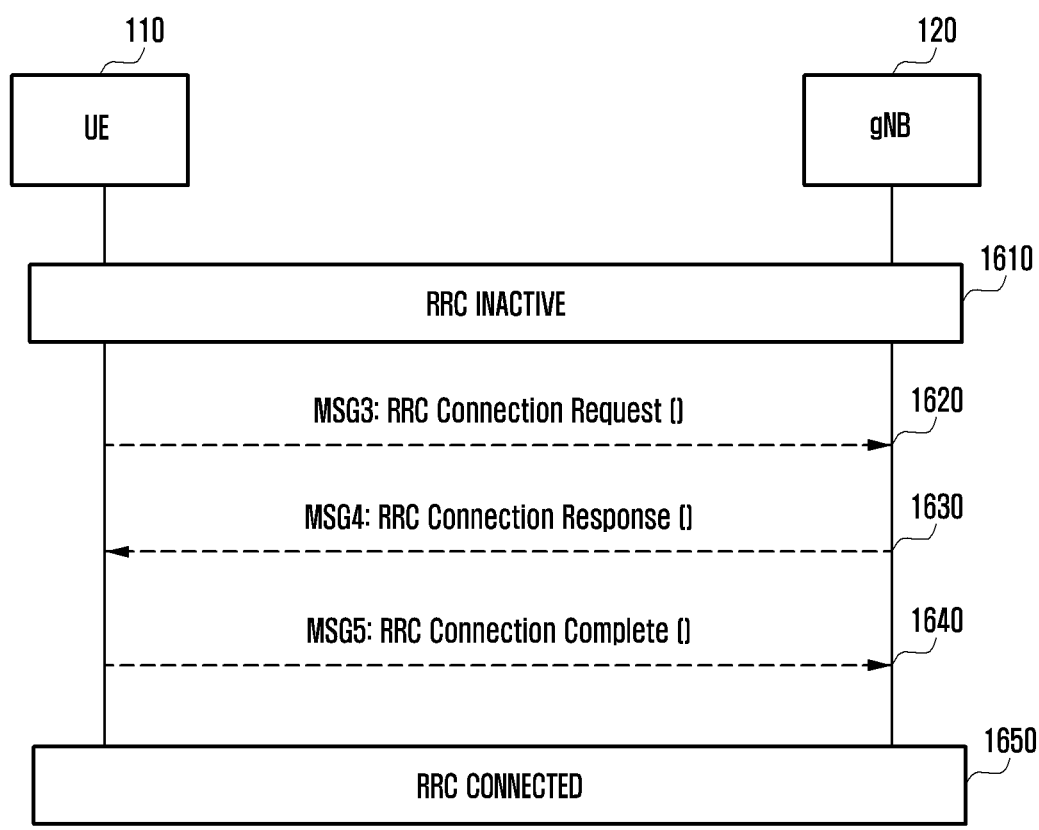
FIG. 16 depicts a procedure for RRC state switching from the RRC inactive state to the RRC connected state according to an embodiment of the present invention.

FIG. 16 depicts a procedure for RRC state switching from the RRC inactive state to the RRC connected state according to an embodiment of the present invention.

With reference to FIG. 16, for changing the RRC state from the RRC inactive state to the RRC connected state, 3-step RRC messaging (request, response, complete) can be used by the base station (NW, or gNB) 120 and the terminal 110 based on the cause value field of an RRC connection request message. In this case, a process for security and UE context retrieval can be performed.

More specifically, at step 1620, the terminal 110 in the RRC inactive state 1610 may transmit an RRC connection request message to the base station 120. Here, the RRC connection request message may be the MSG3, and may include a cause value. This will be described in detail later.

At step 1630, the base station 120 may transmit an RRC connection response message to the terminal 110. Here, the RRC connection response message may be the MSG4.

At step 1640, the terminal 110 may transmit an RRC connection complete message as a reply to the base station 120. Here, the RRC connection complete message may be the MSG5. Thereby, the terminal 110 may make a transition to the RRC connected state 1650.

Figure 17:
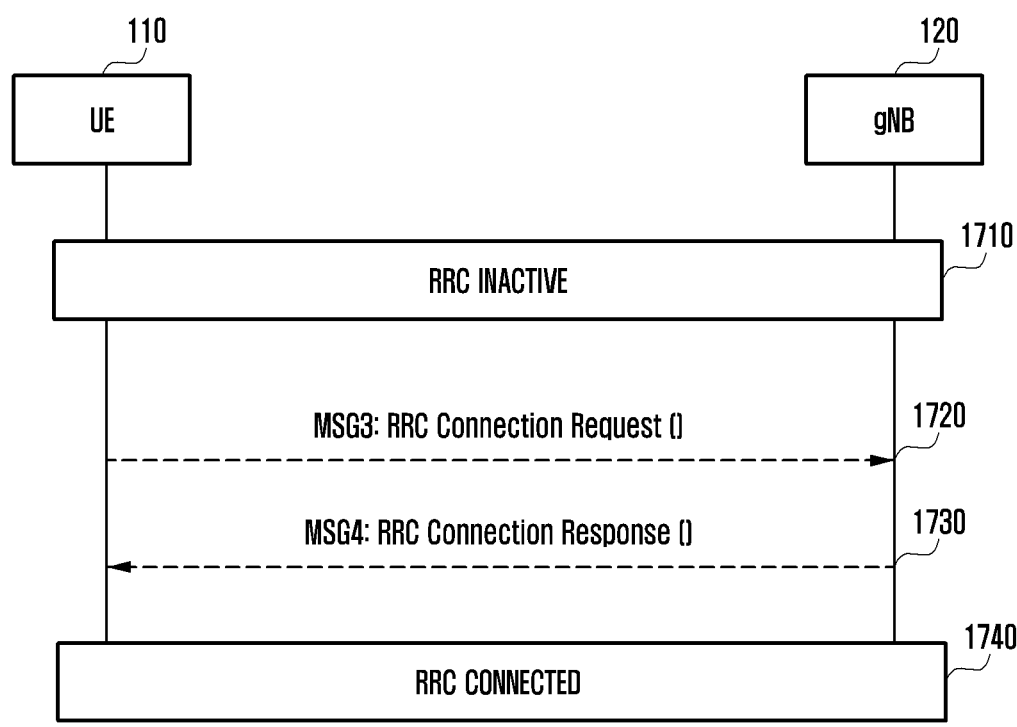
FIG. 17 depicts another procedure for RRC state switching from the RRC inactive state to the RRC connected state according to an embodiment of the present invention.

FIG. 17 depicts another procedure for RRC state switching from the RRC inactive state to the RRC connected state according to an embodiment of the present invention.

With reference to FIG. 17, for changing the RRC state from the RRC inactive state to the RRC connected state, 2-step RRC messaging (request, response) can be used by the base station (NW) 120 and the terminal 110 based on the cause value field of an RRC connection request message. In this case, a process for security and UE context retrieval may be not performed.

More specifically, at step 1720, the terminal 110 in the RRC inactive state 1710 may transmit an RRC connection request message to the base station 120. Here, the RRC connection request message may be the MSG3, and may include a cause value. This will be described in detail later.

At step 1730, the base station 120 may transmit an RRC connection response message to the terminal 110. Here, the RRC connection response message may be the MSG4. Thereby, the terminal 110 may make a transition to the RRC connected state 1740.

As described in connection with FIGS. 16 and 17, the RRC connection request message may include a cause value (resume) in the procedure for changing the RRC state from the RRC inactive state to the RRC connected state. According to the embodiment, the terminal 110 may transmit the base station 120 an RRC connection request message including at least one of UE context ID, cause value (resume), or security information.

The UE context ID is an identifier of the terminal 110 in the RRC inactive state, and may include a unique ID of the terminal to be used for restoring the UE context within the RAN-based paging area. For example, the UE context ID may be a resume_ID, which is a combination of a physical cell ID of the anchor base station to which the terminal 110 has recently been connected and a cell radio network temporary identifier (C-RNTI) of the terminal 110.

The resume cause value may be sent via an RRC connection request (RACH MSG3) for changing the RRC state from the RRC inactive state to the RRC connected state. The cause value of the RRC connection request message may indicate mobile-originated (MO) access (e.g., uplink (UL) data generation), CN or RAN initiated paging (e.g., downlink (DL) data generation), connection for CN-based paging area update, or connection for RAN-based paging area update. The cause value may further indicate RRC connection release through paging, or inter-frequency redistribution through paging.

The security information may be security key information to be used in a new base station, and may include, for example, short MAC-I.

The RRC connection request message may include the following fields shown in Table 10.

The resumeCause field may correspond to the cause value, the resumeIdentity field may correspond to the UE context ID, and the shortResumeMAC-I field may correspond to the security information.

TABLE 10

| RRCConnectionResumeRequest field descriptions |
|---|
| resumeCause |
| Provides the resume cause for the RRC connection resume request as provided by the upper layers. |
| resumeIdentity |
| UE identity to facilitate UE context retrieval at eNB |
| shortResumeMAC-I |
| Authentication token to facilitate UE authentication at eNB |

Figure 18:
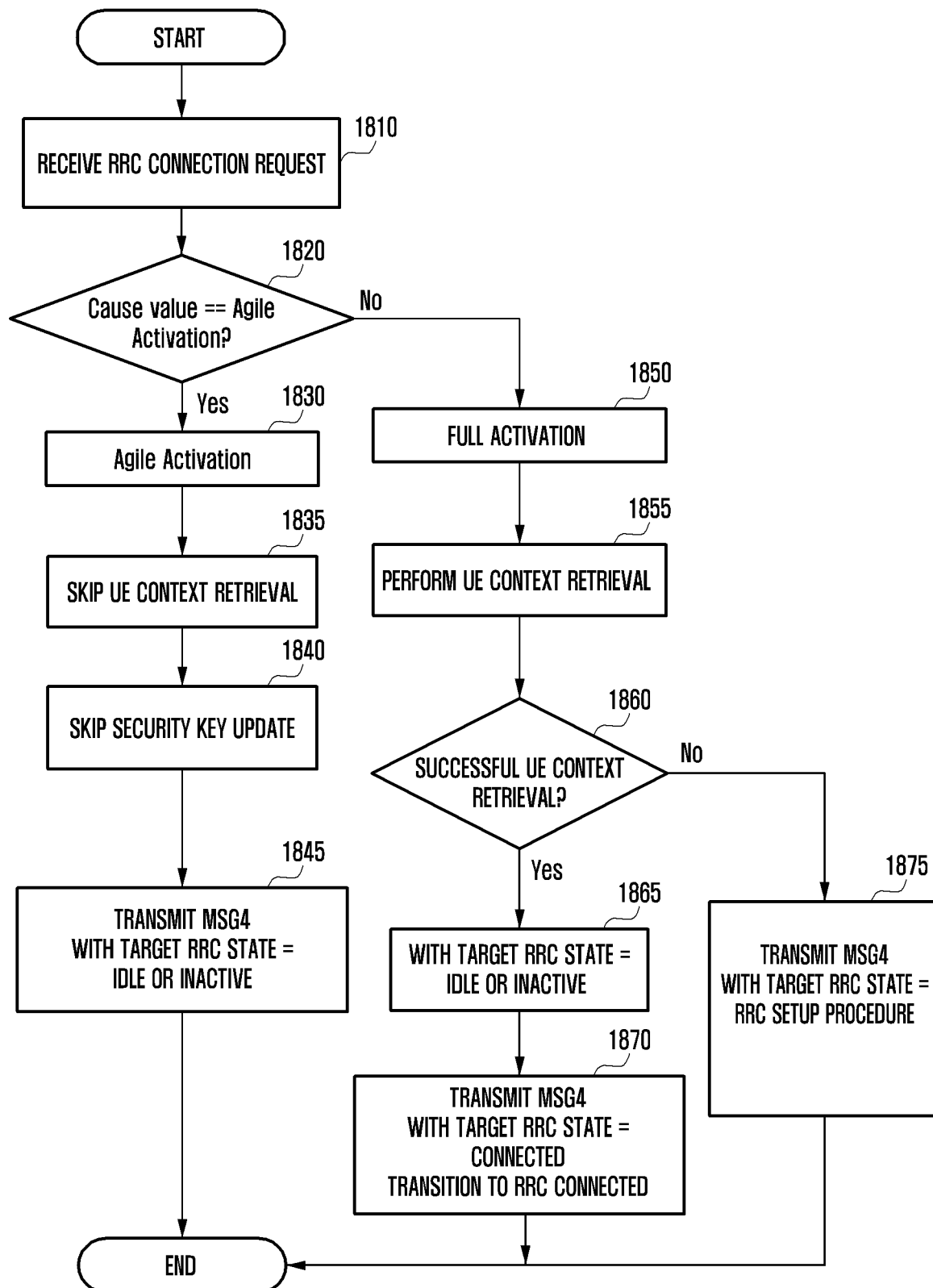
FIG. 18 depicts another procedure for RRC state switching from the RRC inactive state to the RRC connected state according to an embodiment of the present invention.

FIG. 18 depicts another procedure for RRC state switching from the RRC inactive state to the RRC connected state according to an embodiment of the present invention.

With reference to FIG. 18, for changing the RRC state from the RRC inactive state to the RRC connected state, based on the cause value in the RRC connection request message, the (target) base station (NW) 120 may determine whether to retrieve the UE context (i.e., from the anchor base station), or whether to update the security key information.

At step 1810, the base station 120 may receive an RRC connection request message. Here, based on the cause value in the RRC connection request message, RRC state transitions can be classified into the following two categories. The first category (category 1) involves full activation, and the second category (category 2) involves agile activation. To this end, at step 1820, the base station 120 may check whether the cause value included in the RRC connection request message indicates agile activation.

If the cause value indicates full activation at step 1820, RRC state transitions may be made according to category 1. Category 1 requires full RRC connection, and the target base station 120 may retrieve the UE context of the terminal 110 from the anchor base station and may update the security key for application.

If the cause value indicates full activation, the cause value of the RRC connection request message may indicate MO access (e.g., UL data generation), CN or RAN initiated paging (e.g., DL data generation), connection for CN-based paging area update, or connection for RAN-based paging area update.

More specifically, at step 1850, full activation is initiated and, at step 1810, the target base station 120 may retrieve the UE context from the anchor base station.

At step 1860, the target base station 120 may determine whether the UE context is successful retrieved. If UE context retrieval is unsuccessful, at step 1875, the target base station 120 may transmit the MSG4 to the terminal 110. Here, the target RRC state information included in the MSG4 may indicate initiation of the RRC setup procedure. As the target RRC state has been described in connection with FIG. 15, a detailed description thereof is omitted.

If the UE context is successful retrieved, at step 1865, the target base station 120 may perform security key update. At this time, an RRC connection complete message (RACH MSG5) may be transmitted from the terminal 110 to the base station 120 to update the full security key information including the security key of the target base station.

At step 1870, the target base station 120 may transmit the MSG4 to the terminal 110. Here, the target RRC state included in the MSG4 may indicate the RRC connected state, leading to switching to the RRC connected state.

If the cause value indicates agile activation at step 1820, RRC state transitions may be made according to category 2. Category 2 does not require full RRC connection, and it is possible to immediately transition to the RRC idle state without retrieving the UE context from the anchor base station or without security key update.

When the cause value indicates agile activation, the cause value of the RRC connection request may indicate RRC connection release through paging, or inter-frequency redistribution through paging.

More specifically, at step 1830, agile activation is initiated. At step 1835, the target base station 120 may not retrieve the UE context from the anchor base station. Also, at step 1840, the target base station 120 may not perform security key update.

As the target base station 120 does not update the full security key information including the security key of the target base station, it may be unnecessary to transmit an RRC connection complete message (RACH MSG5) from the terminal 110 to the base station 120.

At step 1845, the target base station 120 may transmit the MSG4 to the terminal 110. Here, the target RRC state included in the MSG4 may indicate the RRC idle state or the RRC inactive state, leading to switching to the RRC idle state or the RRC inactive state.

Meanwhile, to transmit the cause value via an RRC connection request message (MSG3), it is possible to explicitly indicate one of individual causes. Alternatively, in consideration of the limited payload size of the RRC connection request message (MSG3), as the number of bits available to represent various causes is limited, the causes may be grouped or categorized depending on whether full activation is required, and the cause value for transmission may indicate only the corresponding group or category. For example, those causes requiring full activation may be categorized into a first group, and those causes not requiring full activation may be categorized into a second group. The cause value for transmission may represent whether a specific cause belongs to the first group or the second group.

In one embodiment, each RRC connection request may carry one cause separately. Alternatively, the causes may be grouped depending on whether full activation is required, and the cause value for transmission may indicate only one of the first group (requiring full activation) or the second group (not requiring full activation). Here, the first group and the second group may include the following causes.

The first group may include causes such as 1-1) MO access, 1-2) RAN initiated paging, and 1-3) RAN PAU.

The second group may include causes such as 2-1) RRC connection release through paging, 2-2) inter-frequency redistribution using paging.

In addition, the resume cause value may be represented for transmission as a ResumeCause or ActivationCause value in the RRC connection request message or the RRC connection resume request message as shown in Table 11 below.

Individual ResumeCause or ActivationCause values may be separately indicated as follows.

TABLE 11

| RRCConnectionRequest message |
|---|
| ResumeCause (ActivationCause) ::= ENUMERATED { |
| emergency, highPriorityAccess, mt-Access, mo-Signalling, |
| mo-Data, delayTolerantAccess-v1020, mo-VoiceCall-v1280, |
| ~~spare1~~ ranAreaUpdate, RRC connection release through paging, Inter-frequency redistribution using paging } |

In addition to a way of the RRC connection request message to carry each cause separately, the causes may be grouped depending on whether full activation is required, and the cause value for transmission may indicate only the corresponding category (first group or second group). The cause value indicating the first group or the second group only may be transmitted as shown in Table 12 below.

TABLE 12

| RRCConnectionRequest message |
|---|
| ResumeCause (ActivationCause) ::= ENUMERATED { |
| emergency, highPriorityAccess, mt-Access, mo-Signalling, |
| mo-Data, delayTolerantAccess-v1020, mo-VoiceCall-v1280, |
| ~~spare1~~ Cause-CAT1, Cause-CAT2} |

Figure 19A:
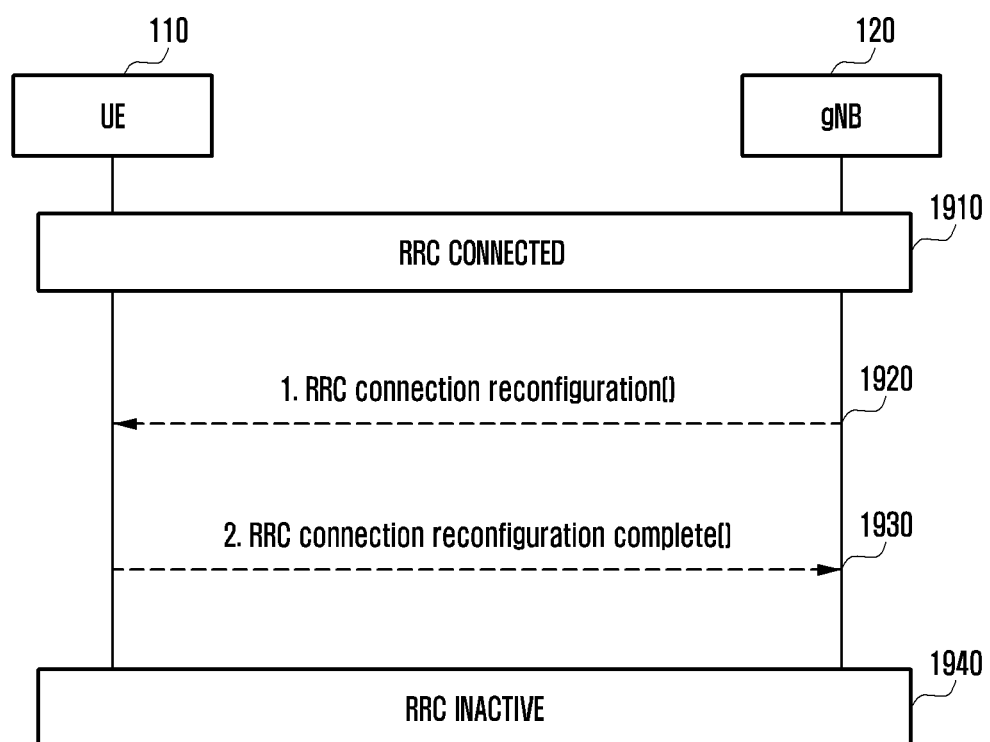
FIG. 19A depicts a procedure for RRC state switching from the RRC connected state to the RRC inactive state according to an embodiment of the present invention.

FIG. 19A depicts a procedure for RRC state switching from the RRC connected state to the RRC inactive state according to an embodiment of the present invention.

With reference to FIG. 19A, to change the RRC state from the RRC connected state to the RRC inactive state, the base station 120 may transmit the UE context related information to the terminal 110 through an RRC connection reconfiguration message, and the terminal 110 may confirm this and transmit an RRC connection reconfiguration complete message to the base station 120.

More specifically, in the RRC connected state 1910, at step 1920, the base station 120 may transmit an RRC connection reconfiguration message to the terminal 110. Here, the RRC connection reconfiguration message may include mobility control information, security information, and UE context identity information.

As a reply to the RRC connection reconfiguration message, at step 1930, the terminal 110 may transmit an RRC connection reconfiguration complete message to the base station 120. Thereby, a transition may be made to the RRC inactive state at step 1940.

Figure 19B:
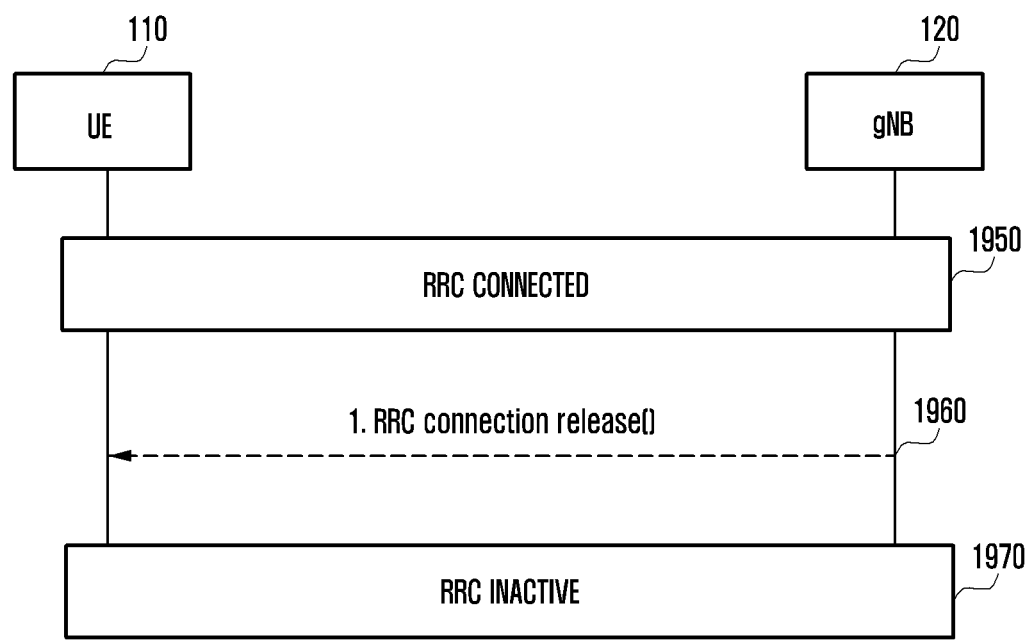
FIG. 19B depicts another procedure for RRC state switching from the RRC connected state to the RRC inactive state according to an embodiment of the present invention.

FIG. 19B depicts another procedure for RRC state switching from the RRC connected state to the RRC inactive state according to an embodiment of the present invention.

With reference to FIG. 19B, when changing the RRC state from the RC connected state to the RRC inactive state, the base station 120 may transmit the UE context related information to the terminal 110 through an RRC connection release message.

More specifically, in the RRC connected state 1950, at step 1960, the base station 120 may transmit an RRC connection release message to the terminal 110. Thereby, a transition may be made to the RRC inactive state at step 1970.

In the procedure of changing the RRC state from the RRC connected state to the RRC inactive state, the RRC message sent by the base station 120 to the terminal 110 may include mobility control information, security information, and UE context identity information. Here, the mobility control information may include RAN-based paging area information and the RAN-based paging cycle, etc.

In order for the base station 120 to configure the above information and to transmit it to the terminal 110, an explicit RRC message such as an RRC connection reconfiguration message or an RRC connection reconfiguration complete message may be required as illustrated in FIG. 19.

To change the RRC state from the RRC connected state to the RRC inactive state, if the base station 120 does not transmit an RRC control signal to the terminal 110 and the terminal 110 autonomously makes an RRC state transition when the condition set by the base station 120 is satisfied, as illustrated in FIG. 20, the terminal 110 may receive in advance the above information (i.e., mobility control information (including RAN-based paging area information and RAN-based paging cycle information), security information, and UE context identity information) in the RRC connected state from the base station 120. Alternatively, the terminal 110 may use the above information (previously configured version) in the RRC inactive state without changing it.

Figure 20A:
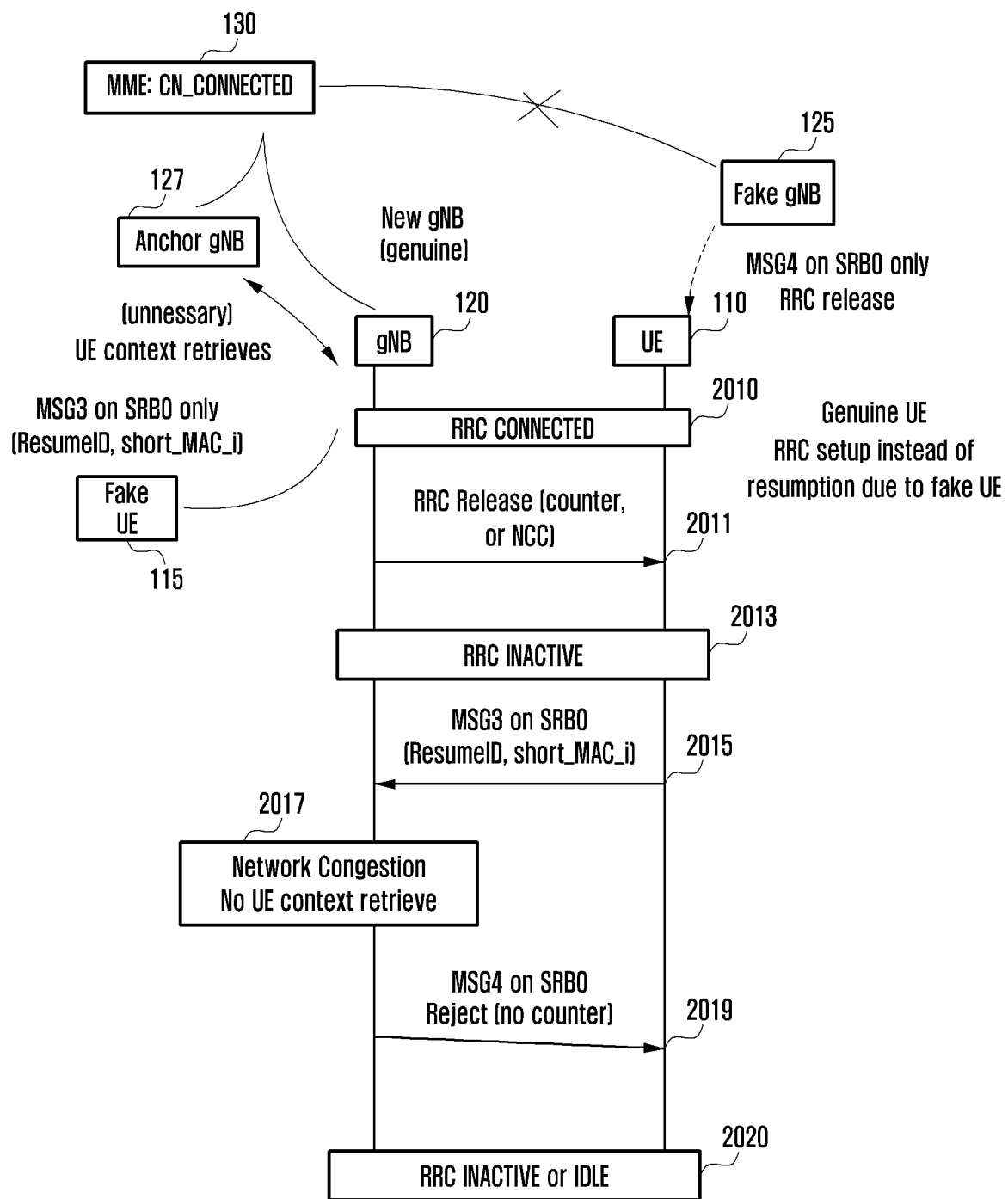
FIG. 20A depicts a situation where a fake terminal or a fake base station makes an attack in the process of RRC state switching from the RRC inactive state to the RRC connected state according to an embodiment of the present invention.

FIG. 20A depicts a situation where a fake terminal or a fake base station makes an attack in the process of RRC state switching from the RRC inactive state to the RRC connected state according to an embodiment of the present invention.

In the situation shown in FIG. 20A where a fake terminal 115 or a fake base station 125 makes an attack in the process of changing the RRC state from the RRC inactive state to the RRC connected state, control signals between the terminal 110 and the base station 120 including RRC messages, SRB options for transmitting the control signals, and pieces of information that the genuine terminal 110 and the fake terminal 115 can have are compared and summarized in Table 13.

TABLE 13

| | | Contained info. | Fake UE knows | Fake UE cannot know but genuine UE knows |
|---|---|---|---|---|
| 0 | RRC connection release to Inactive (SRB1) | New security key generation input information (e.g., (counter, NCC), or transmission of common security key information between base stations to be used in inactive state | | New security key generation input information (e.g., (counter, NCC), or common security key information between base stations to be used in inactive state |
| 3 | MSG3: RRC connection request (SRB0) | ResumeID, shortMAC_I | ResumeID, shortMAC_I | |
| 4-0 | MSG4: RRC connection response: reject (SRB0) | Security is not applied to SRB0, making it difficult to transfer major information | | |
| 4-1 | MSG4: RRC connection response: resume (SRB1) | Security is applied to SRB1, making it possible to transfer major information | | New gNB key |
| 5 | MSG5: RRC connection complete (SRB1) | When MSG4 is received via SRB1, MSG5 is also secured via SRB1 with corresponding security key information as input, making it possible to transfer major information | | Full security information (e.g., full MAC_i) |

To change the RRC state from the RRC connected state 2010 to the RRC inactive state 2013, at step 2011, the base station 120 may transmit the terminal 110 UE context-related information through an RRC connection reconfiguration message (or RRC connection release message). As the RRC release (reconfiguration) message is transmitted in the RRC connected state, the security key KgNB of the base station 120 is applied, and thus the RRC release (reconfiguration) message can be transmitted via SRB1 or SRB2 to which security is applied. Here, the RRC connection reconfiguration message may include mobility control information, security information, and UE context identity information. As security is applied to the above information, the fake terminal 115 or the fake base station 125 cannot intercept the above information.

The security information included in the RRC connection reconfiguration message transmitted from the base station 120 to the terminal 110 may include a next hop chaining counter (NCC), a counter, or security key information KgNB_inactive to be shared between base stations in the inactive state. The security information (NCC, counter, or security key information KgNB_inactive) is used later by the terminal 110 when the terminal 110 accesses a new base station to retrieve the UE context stored in the previous base station, to which the terminal 110 was last connected in the RRC connected state, so as to make an RRC state transition from the RRC inactive state to the RRC connected state.

When the terminal 110 tries to access the new base station, it may transmit an RRC connection request message including UE_resume_ID and security information to the new base station. At this time, the transmission may be performed via SRB1 with security application, or the transmission may be performed via SRB0 without security application.

As a first option, the terminal 110 may transmit an RRC connection request message to the new base station via SRB1. If the new base station does not know the corresponding security key information, it cannot analyze received UE_resume_ID and security information. Hence, the new base station cannot retrieve the configuration information (DRB, SRB, RRC configuration information, or the like) of the terminal 110 by sending a request for the UE context to the anchor base station 127 corresponding to the terminal 110.

Generally, in the existing network, since the anchor base station 127 and the new base station cannot share KgNB used for transmission in the RRC connected state with other base stations, the new base station cannot know the corresponding security key information.

In addition to KgNB used for transmission in the RRC connected state, a new common security key to be used in the RRC inactive state between base stations can be set by the CN such as the MME 130 or the anchor base station 127 through RAN-based paging. Then, the terminal 110 may transmit an RRC connection request message to the new base station via SRB1 with application of the new common security key. As the new base station is within the RAN-based paging area of the anchor base station 127, it can receive and analyze the UE_resume_ID and security information based on the new common security key (KgNB_inactive) information. The new base station can retrieve the configuration information (DRB, SRB, RRC configuration information, or the like) of the terminal 110 by sending a request for the UE context to the anchor base station 127 corresponding to the terminal 110.

As a second option, the terminal 110 may transmit an RRC connection request message to the new base station via SRB0 (step 2015). In this case, as security is not applied to the UE_resume_ID and security information, the new base station can analyze the above information and retrieve the UE context from the anchor base station 127 without security key information. However, the fake base station 125 or the fake terminal 115 can also receive and analyze the above information.

The new base station (gNB) may transmit an RRC connection reconfiguration response message as the RACH MSG4 to the terminal 110. In this case, the transmission may be performed via SRB1 with security application, or the transmission may be performed via SRB0 without security application.

If the new base station has successfully retrieved the UE context from the anchor base station 127, it may transmit an RRC connection reconfiguration response message as the RACH MSG4 to the terminal 110 via SRB1 with security application. In this case, the security key information of the new base station included in the RRC connection reconfiguration response message as the RACH MSG4 is transmitted via SRB1. Hence, even if the fake terminal 115 receives the security key information, the fake terminal 115 cannot analyze that information.

Hence, based on the security key information of the new base station included in the RRC connection (reconfiguration) response message transmitted as the RACH MSG4 via SRB1, the terminal 110 may transmit full security key information (e.g., full MAC_i information) to the new base station via the RACH MSG5 (e.g., RRC connection reconfiguration complete message).

Therefore, as a way to cope with a security risk, the UE 110 may apply the RRC inactive state common key of base stations to the UE_resume_ID and security information (e.g., short_MAC_i) to be included in the RACH MSG3 (RRC connection request message) and transmit it to the new base station via SRB1. If the UE context is successfully retrieved, the new base station may transmit an RRC connection reconfiguration response message as the MSG4 to the terminal 110 via SRB1 based on the security key information included in the retrieved UE context. Here, the MSG4 includes security key information for the new base station. Based on this security information, the terminal 110 can transmit full security related information (e.g., full MAC_i) to the new base station via the MSG5.

As another way to cope with a security risk, the UE 110 may transmit the UE_resume_ID and security information (e.g., short_MAC_i) to be included in the RACH MSG3 (RRC connection request message) to the new base station via SRB0 without security key application (step 2015). If the UE context is successfully retrieved, the new base station may transmit an RRC connection reconfiguration response message as the MSG4 to the terminal 110 via SRB1 based on the security key information included in the retrieved UE context. Here, the MSG4 includes security key information for the new base station. Based on this security information, the terminal 110 can transmit full security related information (e.g., full MAC_i) to the new base station via the MSG5.

If the new base station fails to retrieve the UE context of the terminal 110 from the anchor base station 127 (step 2016), as the new base station cannot retrieve the security key information, it has to transmit the RRC connection reconfiguration response message as the RACH MSG4 via SRB0 (step 2017). In this case, the fake base station 125 and the fake terminal 115 can analyze (decipher) this message (obtain information). Hence, the new base station cannot transmit the security key information of the new base station to the terminal 110 via the MSG4. Upon receiving the RRC connection (reconfiguration) response message transmitted via SRB0 owing to failure of UE context retrieval, the terminal 110 rejects the received message (step 2020) and cannot transmit the security key information via an RRC connection complete message (MSG5).

As described above in connection with FIG. 15, it is possible to control RRC state switching of the terminal 110 by transmitting the RACH MSG4 (RRC connection response) indicating the target RRC state according to the network condition via SRB0. Here, as retrieval of the UE context has failed, the terminal 110 may make a transition to the RRC idle state, the RRC connected state, or the RRC inactive state according to the target RRC state notified by the base station.

If the target RRC state indicates the RRC inactive state, the terminal 110 waits in the RRC inactive state and may attempt to make an RRC connection again after expiration of a timer set by the base station.

If the target RRC state indicates the RRC connected state, as there is no valid UE context, the terminal 110 may initiate again the RRC connection setup procedure (a procedure for switching from the RRC idle state to the RRC connected state) as a fallback process.

When the network is congested, the new base station may control RRC state switching of the terminal 110 by transmitting the RACH MSG4 (RRC connection response) indicating the target RRC state according to the network condition. If the new base station (target gNB) succeeds in retrieval of the UE context and transmits the RACH MSG4 (RRC connection response message) marked "reject" via the SRB1, the terminal 110 may implicitly understand that the corresponding base station has successfully retrieved the UE context but rejected the request owing to the network condition such as congestion. Additionally, if the target RRC state indicates the RRC inactive state, the terminal 110 waits in the RRC inactive state and may attempt to make an RRC connection again after expiration of a timer set by the base station.

When rejecting a connection request (RRC connection request) of the terminal 110 owing to the network condition such as congestion, if the new base station does not perform UE context retrieval, as the new base station has no information on the security key, it may transmit the terminal 110 the RACH MSG4 (RRC connection response message) marked "reject" via SRB0.

When rejection (RRC release) is performed with the RACH MSG4 (RRC connection response) via SRB0, the fake base station 125 can also perform rejection (RRC release) with the RACH MSG4 (RRC connection response) via SRB0 without security key information. Hence, the CN (core network or MME) or the anchor base station 127 may transmit information for distinguishing a valid genuine base station via valid system information. The information for distinguishing a valid genuine base station may be information enabling the terminal 110 to identify a valid base station, and may be unique information included in system information, SS (SSS, PSS), and PBCH. The information for distinguishing a valid genuine base station may include scrambling codes and sequences. For example, the anchor base station 127 may transmit the above information to the base stations within the RAN-based paging area to verify the validity.

Figure 20B:
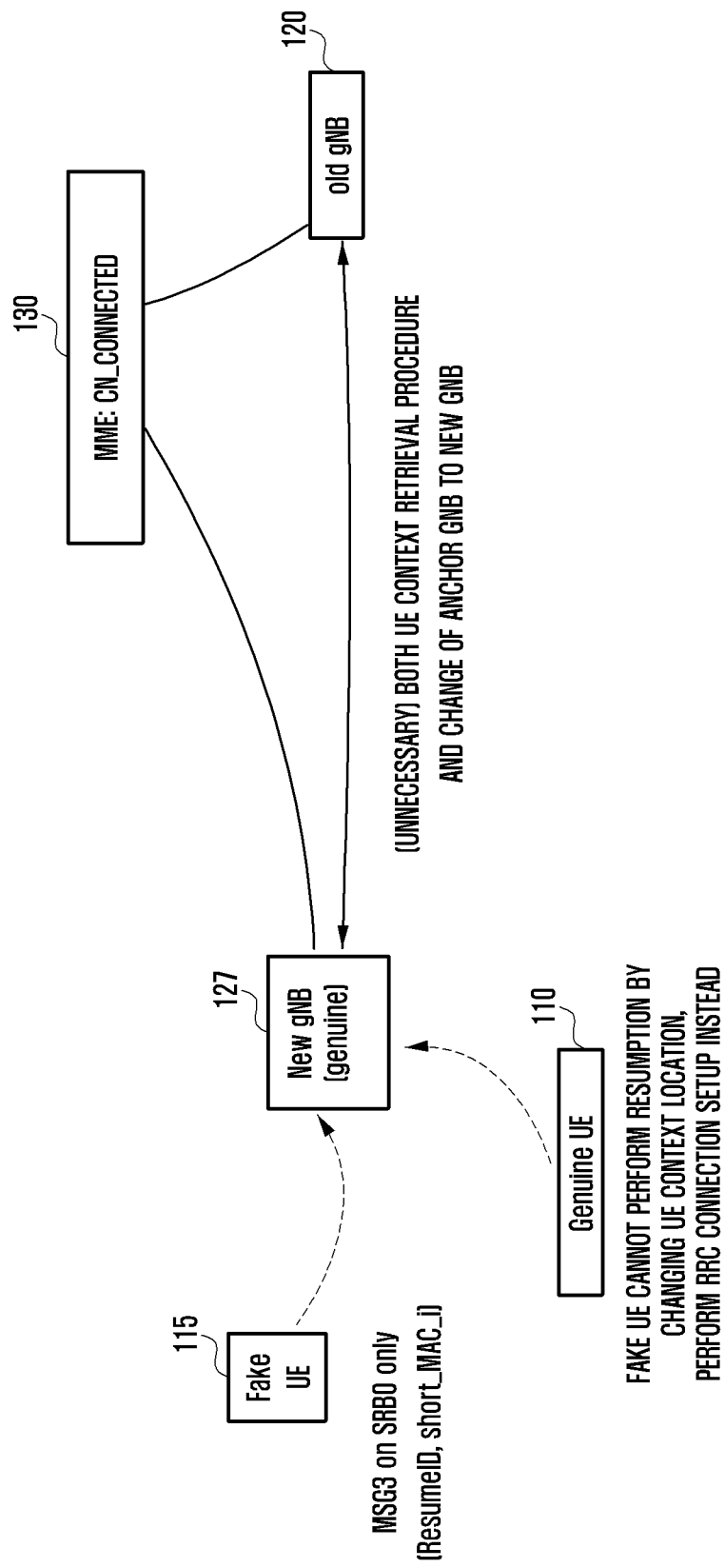
FIG. 20B depicts a situation where a fake terminal makes an attack in the process of RRC state switching from the RRC inactive state to the RRC connected state according to an embodiment of the present invention.

FIG. 20B depicts a situation where a fake terminal makes an attack in the process of RRC state switching from the RRC inactive state to the RRC connected state according to an embodiment of the present invention.

With reference to FIG. 20B, a fake terminal 115 may make an attack while the RRC state of the terminal 110 is changed from the RRC inactive state to the RRC connected state. In such a situation, for example, the genuine base station 127 and the terminal 110 may have a disadvantage that the new base station 127 performs UE context retrieval and changes the anchor base station to the new base station at the same time.

When the terminal 110 transmits an RRC connection request message to the base station 127 via SRB0, as security is not applied to the UE_resume_ID and security information, the new base station 127 may analyze the corresponding information and retrieve the UE context from the anchor base station without security key information. However, the fake terminal 115 can also receive and analyze the above information.

The fake terminal 115 may obtain the UE_resume_ID and security information (e.g., short_MAC_i) of the genuine terminal 110 and may transmit an RRC connection request message to the new base station 127 using the information. The new base station 127 cannot distinguish the fake terminal 115 from the genuine terminal 110 and can initiate a procedure to retrieve the UE context from the anchor base station. However, this is an unnecessary process caused by the fake terminal 115. In addition, after the UE context is transferred from the anchor base station to the new base station 127, as there is no valid UE context in the anchor base station, the genuine terminal 110 may be subject to delays and disadvantages because it should perform a fallback procedure for returning to the RRC idle state and making an RRC connection request and then perform the RRC connection setup procedure. Further, as the genuine terminal 110 does not know that the fake terminal 115 made an RRC connection request to the new base station 127 and transferred the UE context to the new base station 127, it attempts resumption at first by trial and error. Thereafter, if recovery of the UE context fails (delay in this process), the genuine terminal 110 should perform a fallback procedure for returning to the RRC idle state and making an RRC connection request and then perform the RRC connection setup procedure, so that it may be subject to delays.

The fake terminal 115 knows only the UE_resume_ID and security information (short MAC_i) of the genuine terminal 115, and cannot obtain the full security key information needed to communicate with the new base station 127 because security is applied via SRB1 to the MSG4 (e.g., RRC connection response message) from the new base station 127. The fake terminal 115 cannot transmit the full security key information (e.g., full MAC_i) to be used in the new base station 127 by means of the MSG5 (e.g., RRC connection complete message) via SRB 1. As a result, the fake terminal 115 cannot transmit actual data.

Figure 20C:
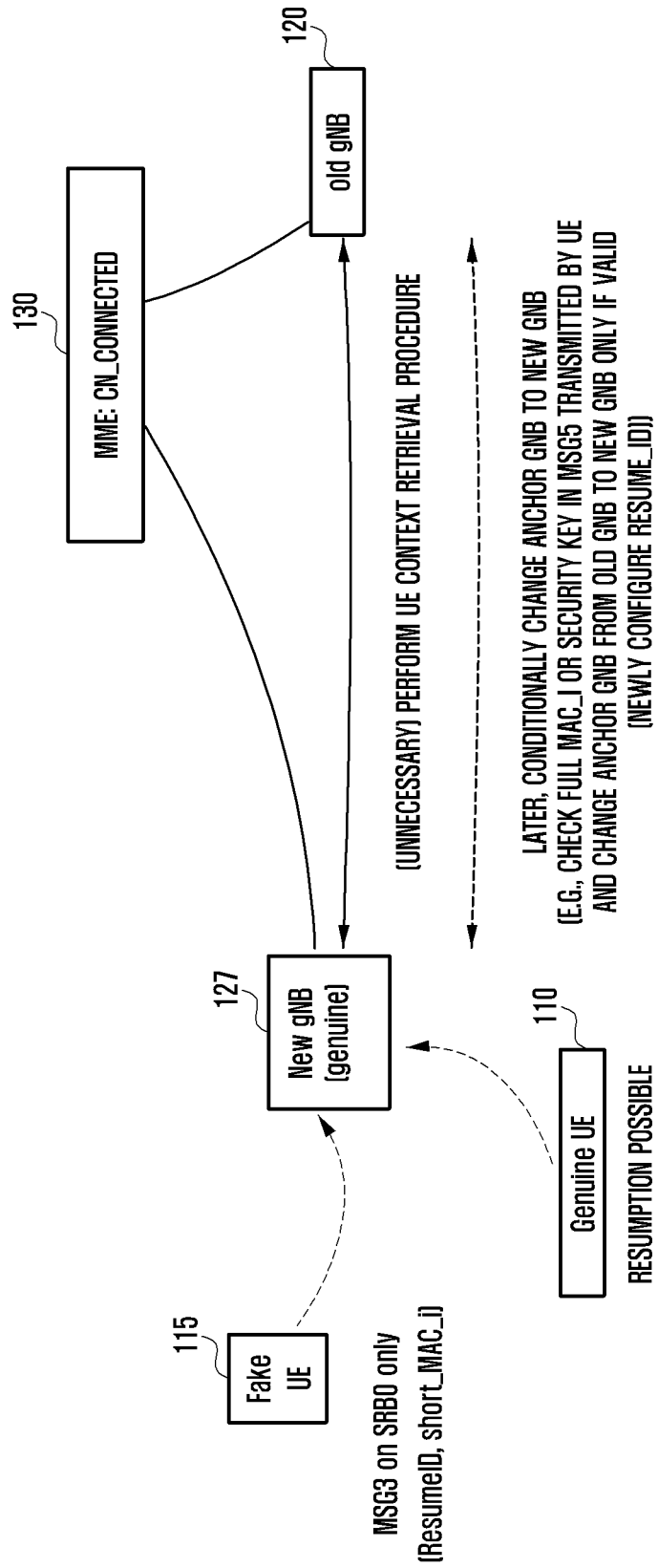
FIG. 20C depicts another situation where a fake terminal makes an attack in the process of RRC state switching from the RRC inactive state to the RRC connected state according to an embodiment of the present invention.

FIG. 20C depicts another situation where a fake terminal makes an attack in the process of RRC state switching from the RRC inactive state to the RRC connected state according to an embodiment of the present invention.

With reference to FIG. 20C, a fake terminal 115 may make an attack while the RRC state of the terminal 110 is changed from the RRC inactive state to the RRC connected state. In such a situation, the new base station 127 may retrieve the UE context, receive full security key information from the terminal 110 via the MSG5, and change the anchor base station to the new base station depending upon the validity of the security key information. This operation may be advantageous to the genuine terminal 110.

When the terminal 110 transmits an RRC connection request (resume) message, the new base station (target gNB) 127 may check whether the corresponding UE context from the anchor base station is valid to obtain the corresponding information. The new base station 127 may transmit the terminal 110 an RRC connection response message as the MSG4 via SRB1 to which security is applied. The new base station 127 can conditionally perform a procedure for retrieving the UE context from the anchor base station. For example, if the full security key information (e.g., full MAC_i) is transmitted through the MSG5 (e.g., RRC connection complete message) from the terminal 110 to the new base station 127, and the MSG5 is transmitted via SRB1 to which security reflecting the security key information of the new base station loaded in the MSG4 (e.g., RRC connection response message) previously transmitted via SRB1 is applied, the new base station 127 may perform a procedure for retrieving the UE context from the anchor base station.

Thereby, in a case where the MSG3 (RRC connection request message) is transmitted via SRB0 without security application, when the genuine terminal 110 makes an RRC state transition from the RRC inactive state to the RRC connected state, it is possible to prevent the delay due to the fake terminal 115. Here, the delay may be caused because the genuine terminal 110 may have to attempt resumption and, if recovery of the UE context fails (delay in this process), perform a fallback procedure for returning to the RRC idle state and making an RRC connection request, and then perform the RRC connection setup procedure.

Figure 21:
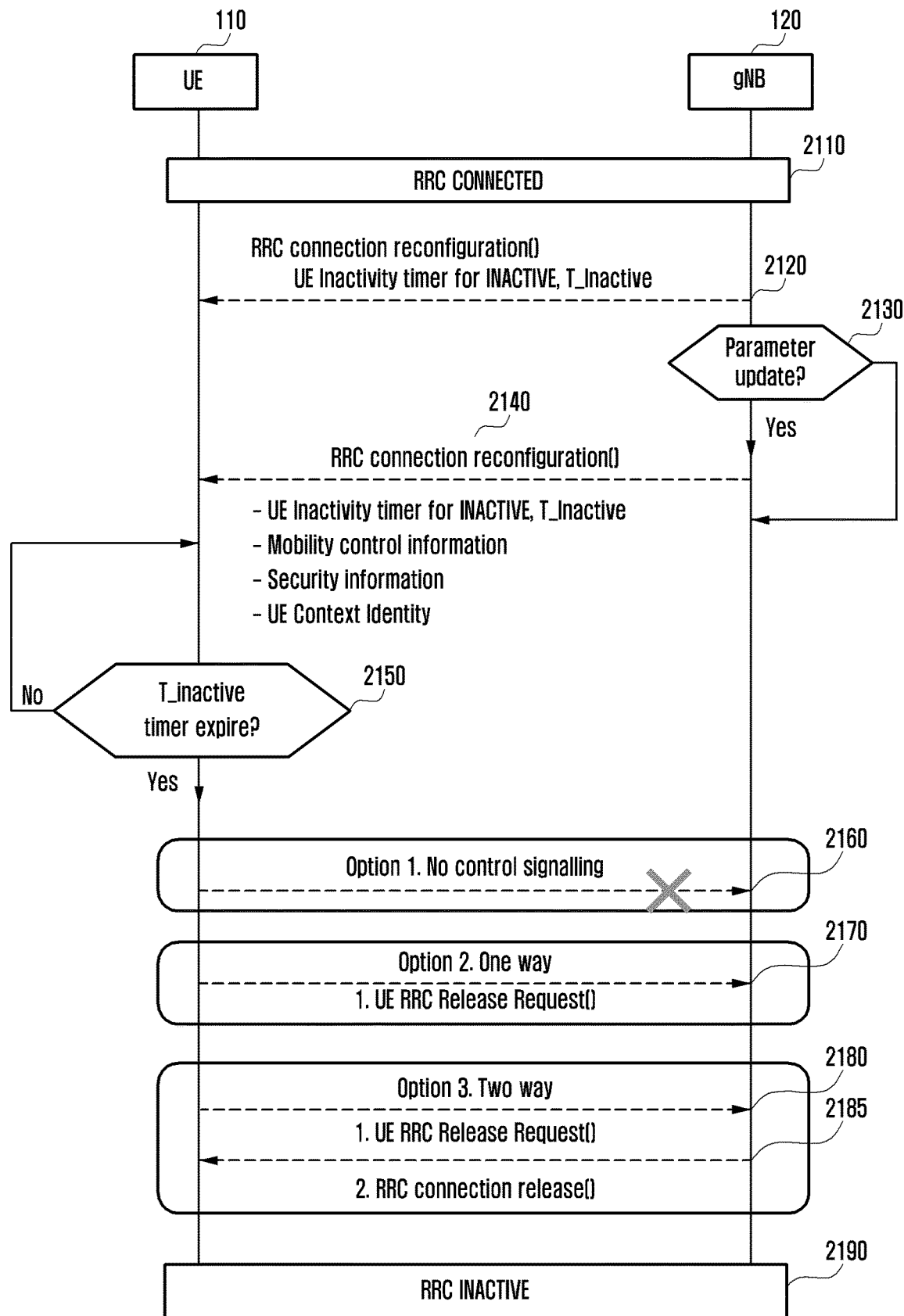
FIG. 21 depicts another procedure for RRC state switching from the RRC connected state to the RRC inactive state according to an embodiment of the present invention.

FIG. 21 depicts another procedure for RRC state switching from the RRC connected state to the RRC inactive state according to an embodiment of the present invention.

With reference to FIG. 21, when the RRC state is changed from the RRC connected state to the RRC inactive state, the terminal 110 can autonomously perform RRC connection release without an RRC control signal from the base station 120.

More specifically, in the RRC connected state 2110, at step 2120, the base station 120 may transmit an RRC connection reconfiguration message to the terminal 110. Here, the RRC connection reconfiguration message may include a UE inactivity timer (e.g., T_Inactive) for switching to the RRC inactive state.

At step 2130, the base station 120 can check whether parameters have been updated. If parameters have been updated, at step 2140, the base station 120 may transmit the updated parameter information to the terminal 110 through an RRC connection reconfiguration message. Here, the RRC connection reconfiguration message may include, for example, a UE inactivity timer (e.g., T_Inactive) for switching to the RRC inactive state, mobility control information (including RAN-based paging area information and RAN-based paging cycle information), security information, and UE context identity information. In one embodiment, if there is no parameter update, the RRC connection reconfiguration message transmitted at step 2120 may further include mobility control information (including RAN-based paging area information and RAN-based paging cycle information), security information, and UE context identity information.

Thereafter, at step 2150, the terminal 110 may check whether the UE inactivity timer (T_Inactive) has expired, and it may make a transition to the RRC inactive state when the timer has expired.

Switching to the RRC inactive state may be achieved in the following three ways.

In the first option, a transition is made to the RRC inactive state 2190 without transmitting a separate control signal as indicated by step 2160.

In the second option, as a one-way process, the terminal 110 transmits an RRC release request message (or UE RRC release request message) to the base station 120 at step 2170, and then a transition is made to the RRC inactive state 2190.

In the third option, as a two-way process, the terminal 110 transmits an RRC release request message (or UE RRC release request message) to the base station 120 at step 2180, and the base station 120 transmits an RRC connection release message as a reply to the terminal 110 at step 2185. Then, a transition is made to the RRC inactive state 2190.

Figure 22:
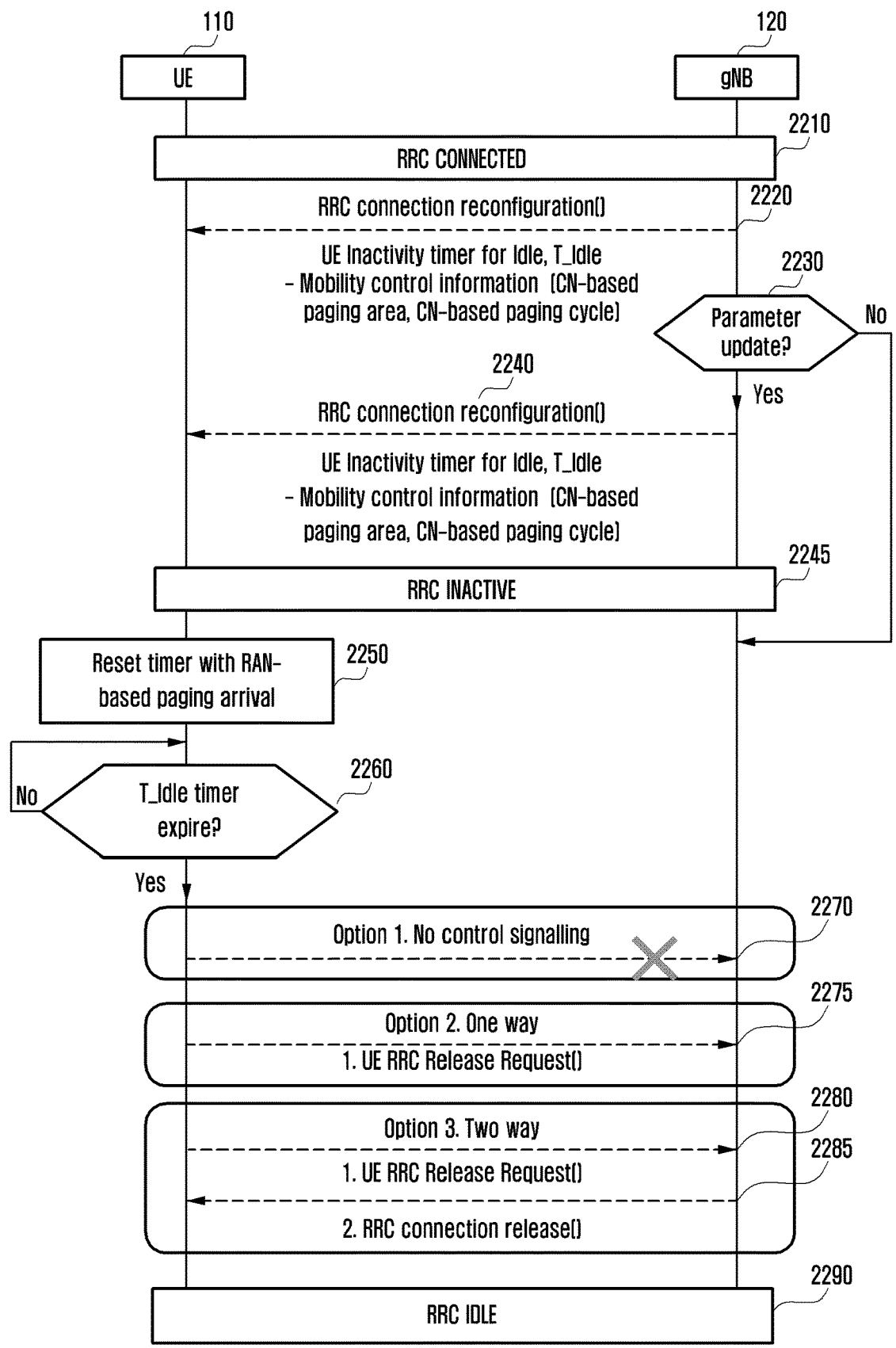
FIG. 22 depicts a procedure for RRC state switching from the RRC inactive state to the RRC idle state according to an embodiment of the present invention.

FIG. 22 depicts a procedure for RRC state switching from the RRC inactive state to the RRC idle state according to an embodiment of the present invention.

With reference to FIG. 22, when the RRC state is changed from the RRC inactive state to the RRC idle state, the terminal 110 can autonomously perform RRC connection release without an RRC control signal from the base station 120.

More specifically, in the RRC connected state 2210, at step 2220, the base station 120 may transmit an RRC connection reconfiguration message to the terminal 110. Here, the RRC connection reconfiguration message may include a UE inactivity timer (e.g., T_Inactive) for switching to the RRC inactive state, a UE inactivity timer (e.g., T_Idle) for switching to the RRC idle state, mobility control information (including CN-based paging area information and CN-based paging cycle information), security information, and UE context identity information.

At step 2230, the base station 120 can check whether parameters have been updated. If parameters have been updated, at step 2240, the base station 120 may transmit the updated parameter information to the terminal 110 through an RRC connection reconfiguration message. Here, the RRC connection reconfiguration message may include, for example, a UE inactivity timer (e.g., T_Inactive) for switching to the RRC inactive state, a UE inactivity timer (e.g., T_Idle) for switching to the RRC idle state, mobility control information (including CN-based paging area information and CN-based paging cycle information), security information, and UE context identity information.

Thereafter, at step 2245, a transition is made to the RRC inactive state. At step 2250, the terminal may reset the timer when RAN-based paging arrives.

Later, at step 2260, the terminal 110 may check whether the UE inactivity timer (T_Idle) has expired, and it may make a transition to the RRC idle state 2290 when the timer has expired.

Switching to the RRC idle state may be achieved in the following three ways.

In the first option, a transition is made to the RRC inactive state 2290 without transmitting a separate control signal as indicated by step 2270.

In the second option, as a one-way process, the terminal 110 transmits an RRC release request message (or UE RRC release request message) to the base station 120 at step 2275, and then a transition is made to the RRC inactive state 2290.

In the third option, as a two-way process, the terminal 110 transmits an RRC release request message (or UE RRC release request message) to the base station 120 at step 2280, and the base station 120 transmits an RRC connection release message as a reply to the terminal 110 at step 2285. Then, a transition is made to the RRC inactive state 2290.

Figure 23:
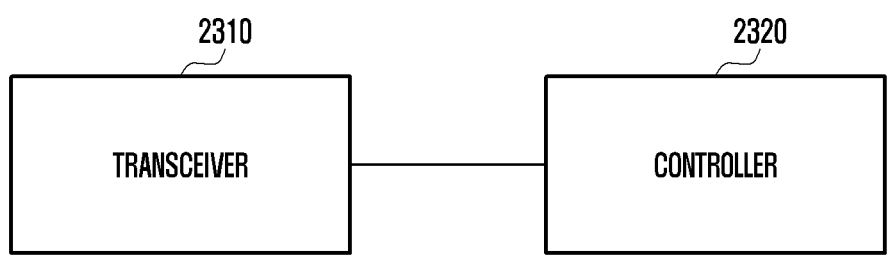
FIG. 23 is a block diagram of a base station according to an embodiment of the present invention.

FIG. 23 is a block diagram of a base station according to an embodiment of the present invention.

With reference to FIG. 23, the base station 120 according to an embodiment of the present invention may include a transceiver 2310, and a controller 2320 configured to control the overall operation of the base station 120.

The controller 2320 controls the base station 120 to perform operations of one of the above-described embodiments. For example, the controller 2320 of the base station 120 may determine a radio resource control (RRC) state transition condition of the terminal and may transmit information on the RRC state transition condition to the terminal. The controller 2320 may receive feedback information for determining the RRC state transition condition from the terminal, determine the RRC state transition condition based on the feedback information, receive an RRC connection request message from the terminal, perform an RRC connection procedure with the terminal according to the cause information included in the RRC connection request message, and receive an RRC state transition request message from the terminal if the RRC state transition condition is satisfied. The RRC state transition condition may include at least one of one or more timers for switching between RRC states or information indicating the next RRC state, and the cause information may include information on whether there is a need to retrieve the UE context and update the security key information.

The transceiver 2310 of the base station 120 may transmit and receive signals according to operations of one of the above-described embodiments.

Meanwhile, the controller 2320 and the transceiver 2310 need not necessarily be implemented as separate components, but may be implemented as a single component in the form of a single chip. The controller 2320 and the transceiver 2310 may be electrically connected to each other.

In addition, the controller 2320 may be, for example, a circuit, an application-specific circuit, or at least one processor. The operations of the base station 120 can be realized by including a memory storing the corresponding program code in a specific component of the base station. That is, the controller 2320 may carry out the above-described operations by using a processor or central processing unit (CPU) to read and execute the program code stored in the memory.

Figure 24:
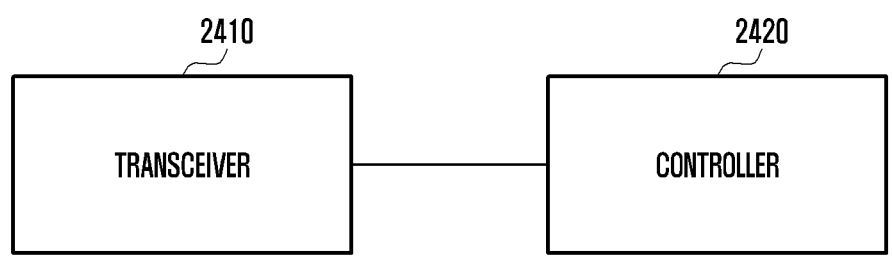
FIG. 24 is a block diagram of a terminal according to an embodiment of the present invention.

FIG. 24 is a block diagram of a terminal according to an embodiment of the present invention.

With reference to FIG. 24, the terminal 110 according to an embodiment of the present invention may include a transceiver 2410, and a controller 2420 configured to control the overall operation of the terminal 110.

The controller 2420 controls the terminal 110 to perform operations of one of the above-described embodiments. For example, the controller 2420 of the terminal 110 may receive information on a radio resource control (RRC) state transition condition from the base station, and may perform the RRC state transition procedure if the RRC state transition condition is satisfied. The controller 2420 may transmit feedback information for determining the RRC state transition condition to the base station, receive information on the RRC state transition condition determined based on the feedback information, transmit an RRC connection request message to the base station, perform an RRC connection procedure with the base station according to the cause information included in the RRC connection request message, and transmit an RRC state transition request message to the base station if the RRC state transition condition is satisfied. The RRC state transition condition may include at least one of one or more timers for switching between RRC states or information indicating the next RRC state, and the cause information may include information on whether there is a need for the base station to retrieve the UE context and update the security key information.

The transceiver 2410 of the terminal 120 may transmit and receive signals according to operations of one of the above-described embodiments.

Meanwhile, the controller 2420 and the transceiver 2410 need not necessarily be implemented as separate components, but may be implemented as a single component in the form of a single chip. The controller 2420 and the transceiver 2410 may be electrically connected to each other.

In addition, the controller 2420 may be, for example, a circuit, an application-specific circuit, or at least one processor. The operations of the terminal 110 can be realized by including a memory storing the corresponding program code in a specific component of the terminal. That is, the controller 2420 may carry out the above-described operations by using a processor or central processing unit (CPU) to read and execute the program code stored in the memory.

Hereinabove, various embodiments of the present invention have been shown and described for the purpose of illustration without limiting the subject matter of the present invention. It should be understood by those skilled in the art that many variations and modifications of the method and apparatus described herein will still fall within the spirit and scope of the present invention.

Various embodiments of the present invention have been described with reference to the accompanying drawings. Specific terms or words used in the description should be construed in accordance with the spirit of the present invention without limiting the subject matter thereof. It should be understood that many variations and modifications of the basic inventive concept described herein will still fall within the spirit and scope of the present invention as defined in the appended claims and their equivalents.

The invention claimed is:

1. A method performed by a terminal in a wireless communication system, the method comprising:
identifying that the terminal is in a radio resource control (RRC) inactive state;
transmitting, to a base station, a first message for switching the RRC inactive state to a RRC connected state over a signaling radio bearer (SRB) 0, wherein the first message comprises resume cause information indicating a resume cause for the switching of the RRC inactive state to the RRC connected state;
receiving, from the base station, a second message to switch the RRC inactive state to the RRC connected state over an SRB1 in case that a user equipment (UE) context is retrieved, as a response to the first message; and
receiving, from the base station, a third message to perform an RRC connection setup procedure over the SRB0 in case that the UE context is not retrieved, as a response to the first message.

2. The method of claim 1, wherein the first message further includes at least one of an identity of the terminal to facilitate a UE context retrieval at the base station, or information on a security to facilitate a terminal authentication at the base station.

3. The method of claim 1, further comprising:
receiving, from the base station, a fourth message for releasing of an RRC connection,
wherein the fourth message includes at least one of a cycle for a radio access network (RAN) paging, information on an RAN area, information for updating a security key, or an identity of the UE context of the terminal in the RRC inactive state.

4. The method of claim 1, further comprising:
determining going to an RRC idle state, in case that a predetermined condition is met; and
performing an RRC connection release procedure, wherein the predetermined condition includes at least one of expiring a predetermined timer, receiving a core network (CN) initiating paging message, or occurring a cell reselection.

5. The method of claim 1, wherein the resume cause includes at least one of a mobile originated access, a radio access network based area update, or a reception of a paging message.

6. A method performed by a base station in a wireless communication system, the method comprising:
receiving, from a terminal, a first message for switching a radio resource control (RRC) inactive state to a RRC connected state over a signaling radio bearer (SRB) 0, wherein the first message comprises resume cause information indicating a resume cause for the switching of the RRC inactive state to the RRC connected state;
transmitting, to the terminal, a second message to switch the RRC inactive state to the RRC connected state over an SRB1 in case that a user equipment (UE) context is retrieved by the base station, as a response to the first message; and
transmitting, to the terminal, a third message to perform an RRC connection setup procedure over the SRB0 in case that the UE context is not retrieved by the base station, as a response to the first message.

7. The method of claim 6, wherein the first message further includes at least one of an identity of the terminal to facilitate a UE context retrieval at the base station, or information on a security to facilitate a terminal authentication at the base station.

8. The method of claim 6, further comprising:
transmitting, to the terminal, a fourth message for releasing of an RRC connection,
wherein the fourth message includes at least one of a cycle for a radio access network (RAN) paging, information on an RAN area, information for updating a security key, or an identity of the UE context of the terminal in an RRC inactive state.

9. The method of claim 6, wherein the resume cause includes at least one of a mobile originated access, a radio access network based area update, or a reception of a paging message.

10. A terminal in a wireless communication system, the terminal comprising:
a transceiver; and
a controller configured to:
identify that the terminal is in a radio resource control (RRC) inactive state,
transmit, to a base station via the transceiver, a first message for switching the RRC inactive state to a RRC connected state over a signaling radio bearer (SRB) 0, wherein the first message comprises resume cause information indicating a resume cause for the switching of the RRC inactive state to the RRC connected state,
receive, from the base station via the transceiver, a second message to switch the RRC inactive state to the RRC connected state over an SRB1 in case that a user equipment (UE) context is retrieved, as a response to the RRC resume request message, and
receive, from the base station via the transceiver, a third message to perform an RRC connection setup procedure over the SRB0 in case that the UE context is not retrieved, as a response to the first message.

11. The terminal of claim 10, wherein the first message further includes at least one of an identity of the terminal to facilitate a UE context retrieval at the base station, or information on a security to facilitate a terminal authentication at the base station.

12. The terminal of claim 10,
wherein the controller is further configured to receive, from the base station via the transceiver, a fourth message for releasing of an RRC connection, and
wherein the fourth message includes at least one of a cycle for a radio access network (RAN) paging, information on an RAN area, information for updating a security key, or an identity of the UE context of the terminal in the RRC inactive state.

13. The terminal of claim 10,
wherein the controller is further configured to determine going to an RRC idle state, in case that a predetermined condition is met and perform an RRC connection release procedure, and
wherein the predetermined condition includes at least one of expiring a predetermined timer, receiving a core network (CN) initiating paging message, or occurring a cell reselection.

14. The terminal of claim 10, wherein the resume cause includes at least one of a mobile originated access, a radio access network based area update, or a reception of a paging message.

15. A base station in a wireless communication system, the base station comprising:
a transceiver; and
a controller configured to:
receive, from a terminal via the transceiver, a first message for switching of a radio resource control (RRC) inactive state to a RRC connected state over a signaling radio bearer (SRB) 0, wherein the first message comprises resume cause information indicating a resume cause for the switching of the RRC inactive state to the RRC connected state,
transmit, to the terminal via the transceiver, a second message to switch the RRC inactive state to the RRC connected state over an SRB1 in case that a user equipment (UE) context is retrieved by the base station, as a response to the first message, and
transmit, to the terminal via the transceiver, a third message to perform an RRC connection setup procedure over the SRB0 in case that the UE context is not retrieved by the base station, as a response to the first message.

16. The base station of claim 15, wherein the first message further includes at least one of an identity of the terminal to facilitate a UE context retrieval at the base station, or information on a security to facilitate a terminal authentication at the base station.

17. The base station of claim 15,
wherein the controller is further configured to transmit, to the terminal, a fourth message for releasing of an RRC connection, and
wherein the fourth message includes at least one of a cycle for a radio access network (RAN) paging, information on an RAN area, information for updating a security key, or an identity of the UE context of the terminal in an RRC inactive state.

18. The base station of claim 15, wherein the resume cause includes at least one of a mobile originated access, a radio access network based area update, or a reception of a paging message.

* * * * *